United States Patent
Matsugashita

(10) Patent No.: US 10,375,069 B2
(45) Date of Patent: Aug. 6, 2019

(54) AUTHORIZATION DELEGATION SYSTEM, INFORMATION PROCESSING APPARATUS, AUTHORIZATION SERVER, CONTROL METHOD, AND STORAGE MEDIUM

(71) Applicant: CANON KABUSHIKI KAISHA, Tokyo (JP)

(72) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 15/362,128

(22) Filed: Nov. 28, 2016

(65) Prior Publication Data

US 2017/0171201 A1    Jun. 15, 2017

(30) Foreign Application Priority Data

Dec. 9, 2015 (JP) ................. 2015-240613

(51) Int. Cl.
*G06F 21/62* (2013.01)
*H04L 29/06* (2006.01)

(52) U.S. Cl.
CPC ...... *H04L 63/0884* (2013.01); *G06F 21/6245* (2013.01); *H04L 63/062* (2013.01); *H04L 63/10* (2013.01); *H04L 63/20* (2013.01)

(58) Field of Classification Search
CPC ... H04L 63/0884; H04L 63/062; H04L 63/10; H04L 63/20; G06F 21/6245
USPC .......................................................... 726/4
See application file for complete search history.

(56) References Cited

U.S. PATENT DOCUMENTS

| 7,788,708 B2* | 8/2010 | Doane ............... G06F 21/31 707/694 |
| 2007/0079369 A1* | 4/2007 | Grinstein ........... G06F 21/31 726/19 |
| 2010/0257578 A1* | 10/2010 | Shukla ............. G06F 21/6218 726/1 |
| 2010/0269156 A1* | 10/2010 | Hohlfeld ........... G06F 21/6218 726/4 |
| 2013/0086645 A1* | 4/2013 | Srinivasan .......... H04L 63/10 726/4 |
| 2014/0380429 A1 | 12/2014 | Matsugashita ............... 726/4 |

(Continued)

FOREIGN PATENT DOCUMENTS

JP    2015-005202 A    1/2015

*Primary Examiner* — Harunur Rashid
*Assistant Examiner* — Angela R Holmes
(74) *Attorney, Agent, or Firm* — Venable LLP

(57) ABSTRACT

A device transmits an acquisition request for first authorization information indicating that a user's authority to create a tenant-dedicated client is delegated to a vendor client on the basis of first authentication information provided from an authorization server in response to the registration of the vendor client. The device registers the tenant-dedicated client in the authorization server on the basis of the first authorization information, and transmits an acquisition request for second authorization information indicating that the user's authority in a service of a resource server is delegated to the tenant-dedicated client on the basis of second authentication information provided from the authorization server in response to the registration of the tenant-dedicated client. Then the device uses the service of the resource server on the basis of the second authorization information.

14 Claims, 14 Drawing Sheets

(56) References Cited

U.S. PATENT DOCUMENTS

2015/0089597 A1* 3/2015 Srinivasan .............. H04L 63/08
726/4
2015/0245205 A1* 8/2015 Kim ...................... H04W 72/10
726/4

* cited by examiner

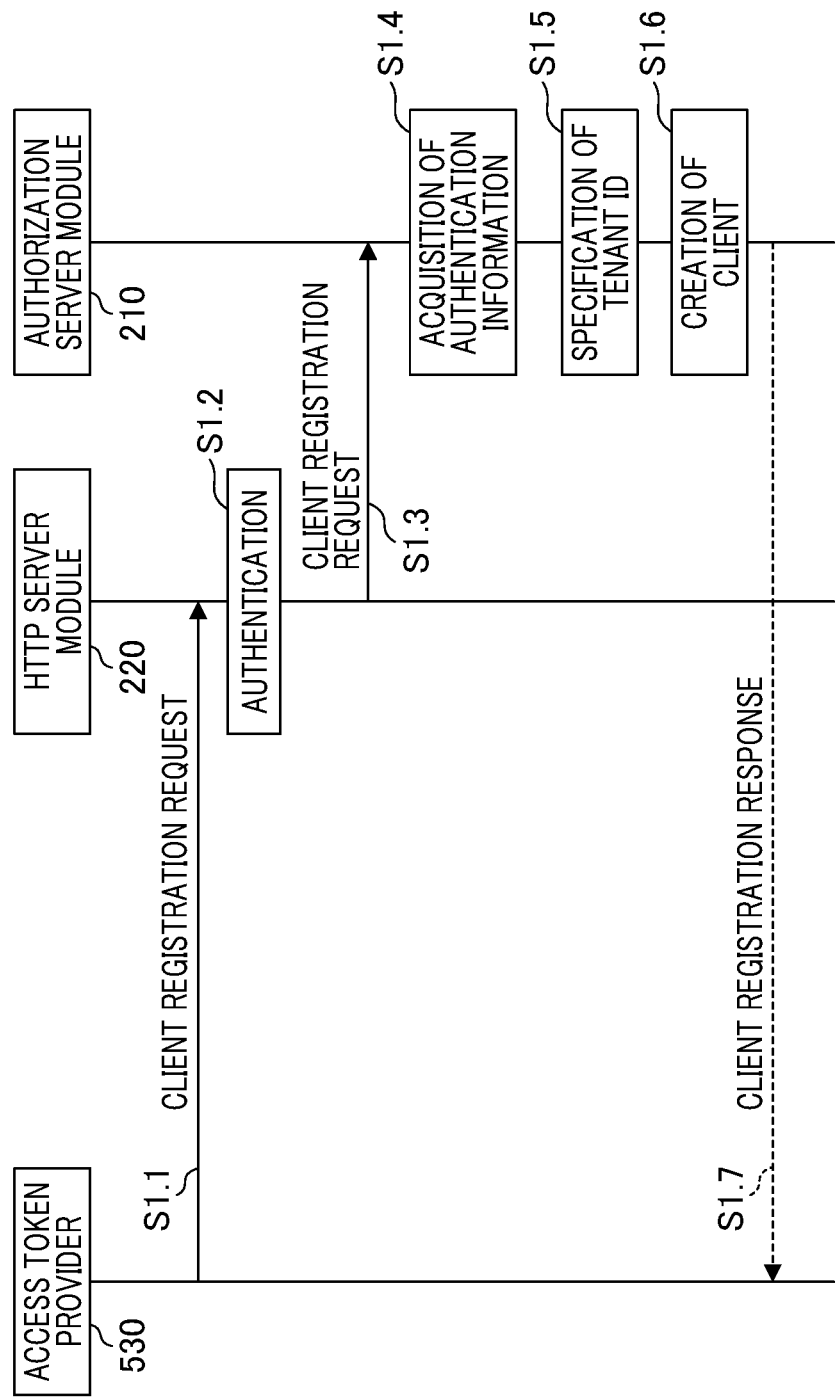

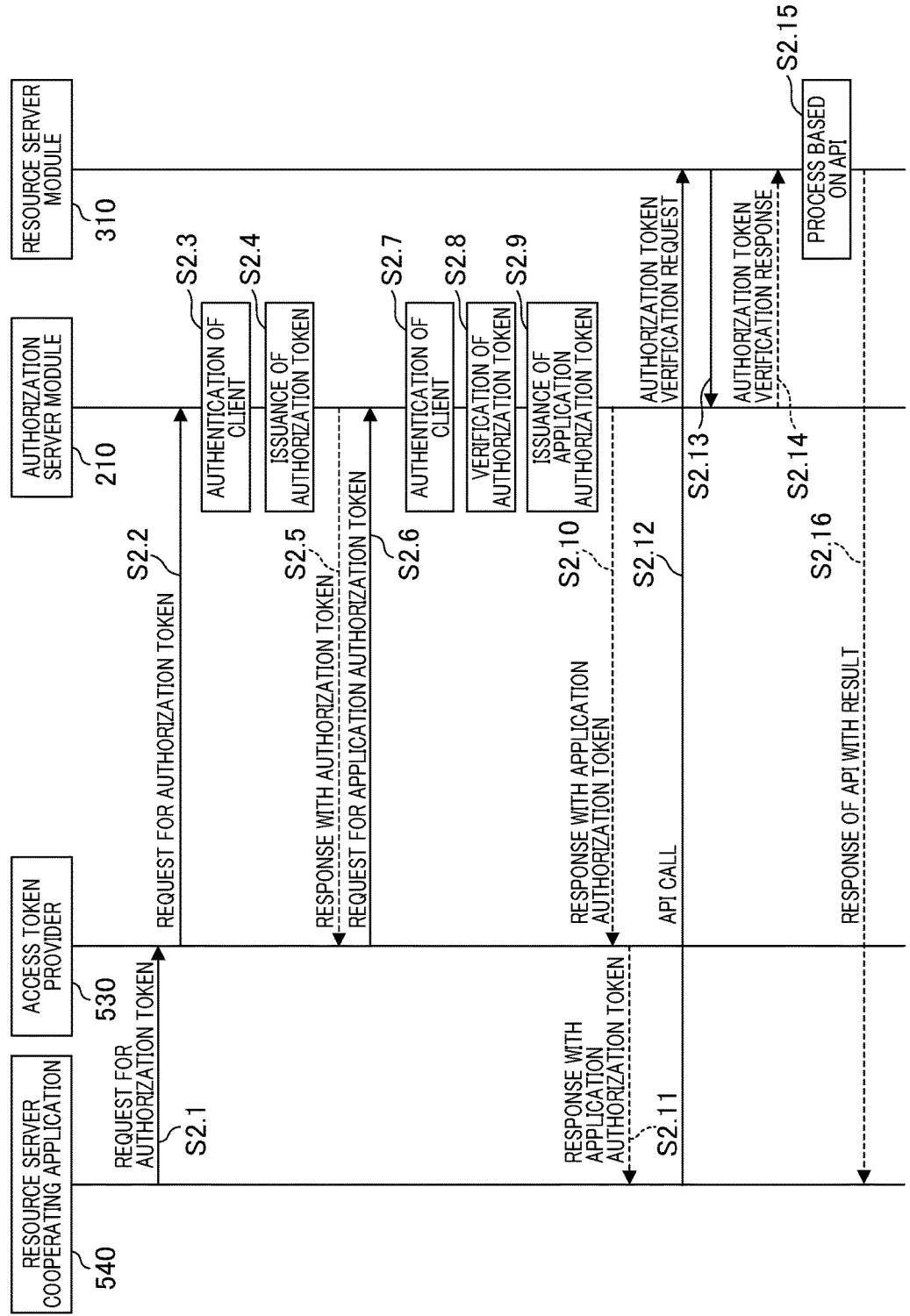

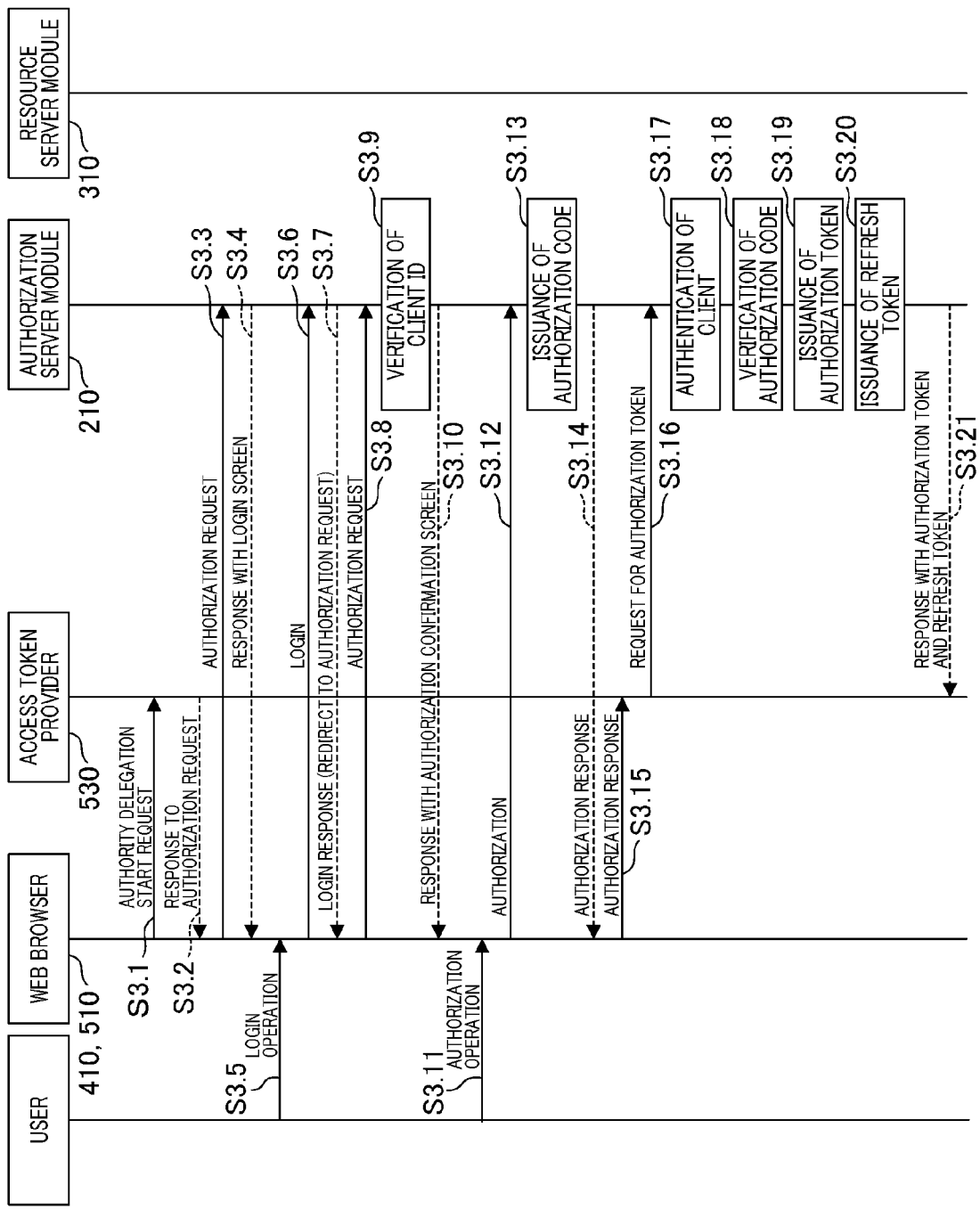

FIG. 13

Table 8

| | Token ID | Type | Client ID | User UUID | Redirect URI | Application ID | Scope |
|---|---|---|---|---|---|---|---|
| Row 1 | cd_000001 | Authorization token | c001@xx.com | 10000001 | https://xx/res | Token provider | Resource |
| Row 2 | at_000001 | Authorization token | c001@xx.com | 10000001 | - | Token provider | Resource |
| Row 3 | rt_000001 | Refresh token | c001@xx.com | 10000001 | - | Token Provider | Resource |

FIG. 14

Table 9

| | Token ID | Type | Client ID | User UUID | Redirect URI | Application ID | Scope |
|---|---|---|---|---|---|---|---|
| Row 1 | cd_000001 | Authorization token | c001@xx.com | 10000001 | https://xx/res | Token provider | Resource |
| Row 2 | at_000001 | Authorization token | c001@xx.com | 10000001 | - | Token provider | Resource |
| Row 3 | rt_000001 | Refresh token | c001@xx.com | 10000001 | - | Token Provider | Resource |
| Row 4 | at_000002 | Authorization token | c001@xx.com | 10000001 | - | APP001 | API |

AUTHORIZATION DELEGATION SYSTEM, INFORMATION PROCESSING APPARATUS, AUTHORIZATION SERVER, CONTROL METHOD, AND STORAGE MEDIUM

BACKGROUND OF THE INVENTION

Field of the Invention

The present invention relates to an authorization delegation system, an information processing apparatus, an authorization server, a control method, and a storage medium.

Description of the Related Art

A cloud service generally publishes an application programming interface (API) of a web service public, and a device or another cloud service can use a function provided by the service via the API. A standard protocol called OAuth 2.0 is established as an authentication and authorization protocol for using the API. In OAuth 2.0, an authorization server performs authentication and authorization in cooperation with a device as a client or another cloud service functioning. A client which has been authenticated and authorized uses the API by acquiring an authorization token from the authorization server and transmitting the acquired authorization token.

In OAuth 2.0, a flow of an authorization protocol is called a Grant Type. As a representative Grant Type, Authorization Code Grant for allowing a user to delegate authority to a client and Client Credentials Grant for allowing a client to access its own resources are defined.

A device is considered to use a Grant Type properly depending on a use case. For example, when cooperation with a cloud service is performed with a user's, who is an owner of a device, operation of the device as a trigger, Authorization Code Grant is selected. On the other hand, when cooperation with a cloud service is performed with detection of a variation in a sensor or an instrument of a device as a trigger, Client Credentials Grant is selected. In this way, it is possible to cope with various use cases using OAuth 2.0.

In order to use OAuth 2.0, it is necessary to register a client in an authorization server in advance and to register a client ID for identifying the client and a secret for authentication in a device functioning as a client. Japanese Patent Laid-Open No. 2015-5202 discloses an authorization delegation system that automatically registers a client for OAuth 2.0. In the authorization delegation system disclosed in Japanese Patent Laid-Open No. 2015-5202, a client is dynamically registered in the authorization server using a client certificate in the form of X.509 which is held in an application. By using the client ID and the secret which have been automatically acquired, it is possible to use various protocols of OAuth 2.0.

In the conventional authorization delegation system, there is no structure for specifying to what tenant a client registered in the cloud service belongs. Accordingly, there is a risk of information on personal privacy or confidential information, which is included in data transmitted from the device, being leaked to another tenant or a vendor providing the cloud service.

SUMMARY OF THE INVENTION

The present invention provides an authorization delegation system that can use a service without leakage of information even when a tenant of a user of a device is changed.

According to an aspect of the present invention, there is provided an authorization delegation system that includes an information processing apparatus, a service providing apparatus configured to provide a service via a network, and an authorization server and that registers the information processing apparatus as a client in the authorization server. The information processing apparatus comprises: a first acquisition requesting unit configured to transmit an acquisition request for first authorization information indicating that a user's authority to create a second client is delegated to a first client on the basis of first authentication information provided from the authorization server in accordance with a registration of the first client in the authorization server; and a registration requesting unit configured to transmit a registration request for the second client to the authorization server in accordance with an acquisition of the first authorization information in response to the acquisition request by the first acquisition requesting unit. The authorization server comprises: a managing unit configured to specify a tenant of the user on the basis of the first authorization information transmitted along with the registration request and to manage the specified tenant and the second client to be newly registered in association with each other; and an issuing unit configured to issue second authentication information corresponding to the second client which is managed in association with the tenant. The information processing apparatus further comprises: a second acquisition requesting unit configured to transmit an acquisition request for second authorization information indicating that a specific authority is delegated to the second client on the basis of the second authentication information provided from the authorization server in accordance with a registration of the second client in response to the registration request; and a using unit configured to use a service of the service providing apparatus on the basis of the second authorization information acquired in response to the acquisition request by the second acquisition requesting unit. The service providing apparatus comprises a storing unit configured to confirm the specified tenant on the basis of the second authorization information and to store data relevant to provision of the service in association with the confirmed tenant.

Further features of the present invention will become apparent from the following description of exemplary embodiments (with reference to the attached drawings).

BRIEF DESCRIPTION OF THE DRAWINGS

FIG. 4 is a diagram illustrating a client registering process.

FIG. 6 is a diagram illustrating a process of calling an API of a resource server module.

FIG. 7 is a diagram illustrating a process when authority delegation is started.

FIG. 13 is a table showing the token management table of the authorization server module, where the hatched row indicates an invalidated record.

FIG. 14 is a table showing an example of the token management table of the authorization server module.

DESCRIPTION OF THE EMBODIMENTS

Figure 1:
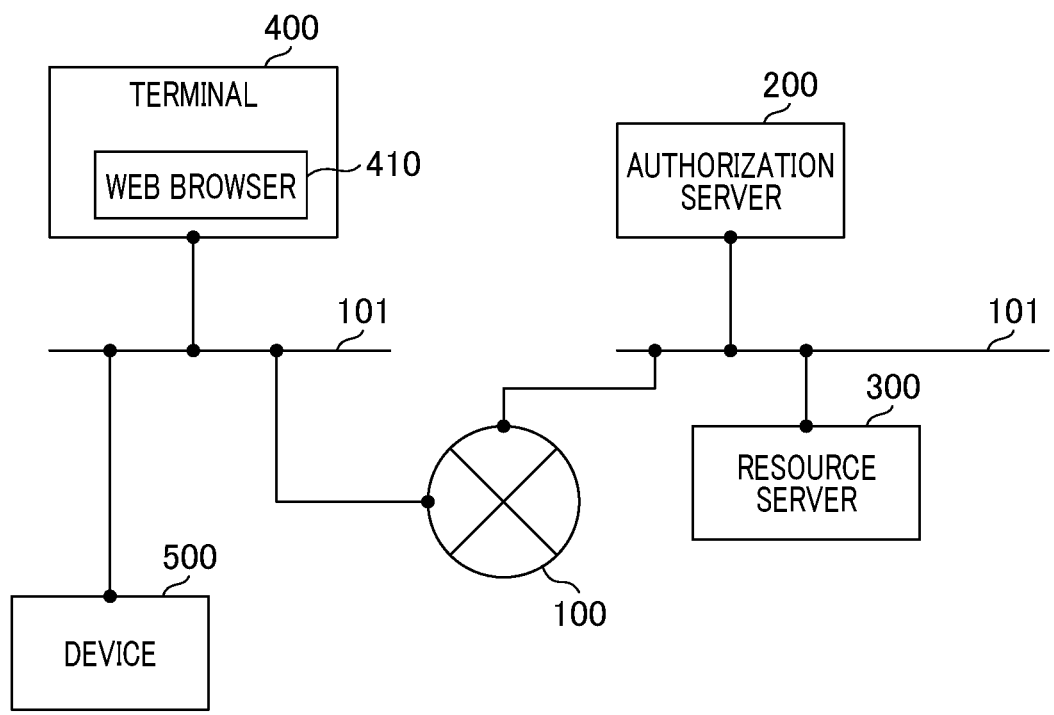
FIG. 1 is a diagram illustrating a configuration of an authorization delegation system.

A plurality of modes will be first described as a client registering mode, problems of the modes will be then described, and then an authorization delegation system according to an embodiment for solving the problems will be described.

As described above, in OAuth 2.0, a plurality of Grant Types are defined. In this embodiment, two types of modes as a mode using Client Credentials Grant and a mode using Authorization Code Grant are described.

The first mode is one type of mode of two types of modes using Client Credentials Grant. This mode is a mode in which a machine number (hereinafter referred to as a device serial ID) which is assigned to a machine of each client so as to individually identify the machine in addition to a client ID as information for identifying a device is associated with a tenant. In a first mode, since a cloud service side associates a device with a tenant, there is an advantage that a user's special operation is not required on the device side. On the other hand, in the first mode, when the device is recycled without changing the device serial ID and is used by a user of another tenant, there is a risk of leakage of information. Details of the first mode will be described below.

The second mode is a mode using Authorization Code Grant. The second mode uses information of a user having delegated authority through Authorization Code Grant so as to associate the device with a specific tenant. In the second mode, a token indicating that authority is delegated from the user is stored in the device and the cloud service is used using the token. In the second mode, since association of the device with the tenant is released by deleting the token stored in the device, it is possible to reduce a risk of leakage of information due to recycling of the device. On the other hand, in the second mode, since the device is associated with the user having delegated authority, there is a disadvantage that the token cannot be used by depriving the user of the authority or deleting user information on the cloud service side. Details of the second mode will be described below.

The third mode includes two types of modes using Client Credentials Grant. The third mode is the most characteristic mode in this embodiment. The third mode is characterized in that a client ID and a secret for using Client Credentials Grant are dynamically issued using Authorization Code Grant. The third mode does not have the disadvantage of the first and second modes and thus is a mode with the lowest risk of leakage of information. Details of the third mode will be described below. The first, second, and third modes are not configured such that only one mode can be exclusively performed, but can be used properly depending on a use case in the device, that is, can be configured to realize all the modes.

Definitions of terms which are used in this specification will be described below.

A web service is a function which is provided to a client by executing software, which is started over a server, in response to a request from the client. A web application which is software of the web service may also be referred to as a web service. In this embodiment, it is assumed that there is a web service provided from a resource server as a cloud service and a user uses the web service provided via a device from the resource server. This assumption is provided for describing this embodiment, and the resource server and the device are not limited to a configuration including a single resource server and a single device. For example, a server group including a plurality of servers may provide a service.

FIG. 1 is a diagram illustrating a configuration of an authorization delegation system according to this embodiment.

A WAN 100 is an abbreviation for a wide area network. That is, in this embodiment, a world wide web (WWW) system is constructed. A LAN 101 is an abbreviation for a local area network connecting elements.

An authorization server 200 performs an authorization process for realizing OAuth 2.0. A resource server 300 functions as a service providing server that provides a service via a network (the LAN 101 and the WAN 100). A terminal 400 is a device which is operated by a user. The terminal 400 includes a web browser 410.

Examples of a device 500 include a printer and a mobile terminal referred to as a smartphone.

The device 500 is registered as a client in the authorization server 200 via the network and uses a service provided from the resource server 300. In a use example of the service, the device 500 transmits and uploads data to the resource server 300. The device 500 includes various modules such as a web browser 510. A user communicates with the authorization server 200 using the web browser 410 or the web browser 510 (FIG. 3B).

The authorization server 200 and the resource server 300 are connected via the LAN 101. The authorization server 200, the resource server 300, the terminal 400, and the device 500 are connected via the WAN 100 so as to communicate with each other. The authorization server 200 and the resource server 300 may be connected via a database server which is not illustrated and the LAN 101, and may be configured to store data which is used by server modules. The resource server 300 and the authorization server 200 may be configured in the same server. The authorization server 200 and the resource server 300 may be configured to be connected via the WAN 100.

Figure 2:
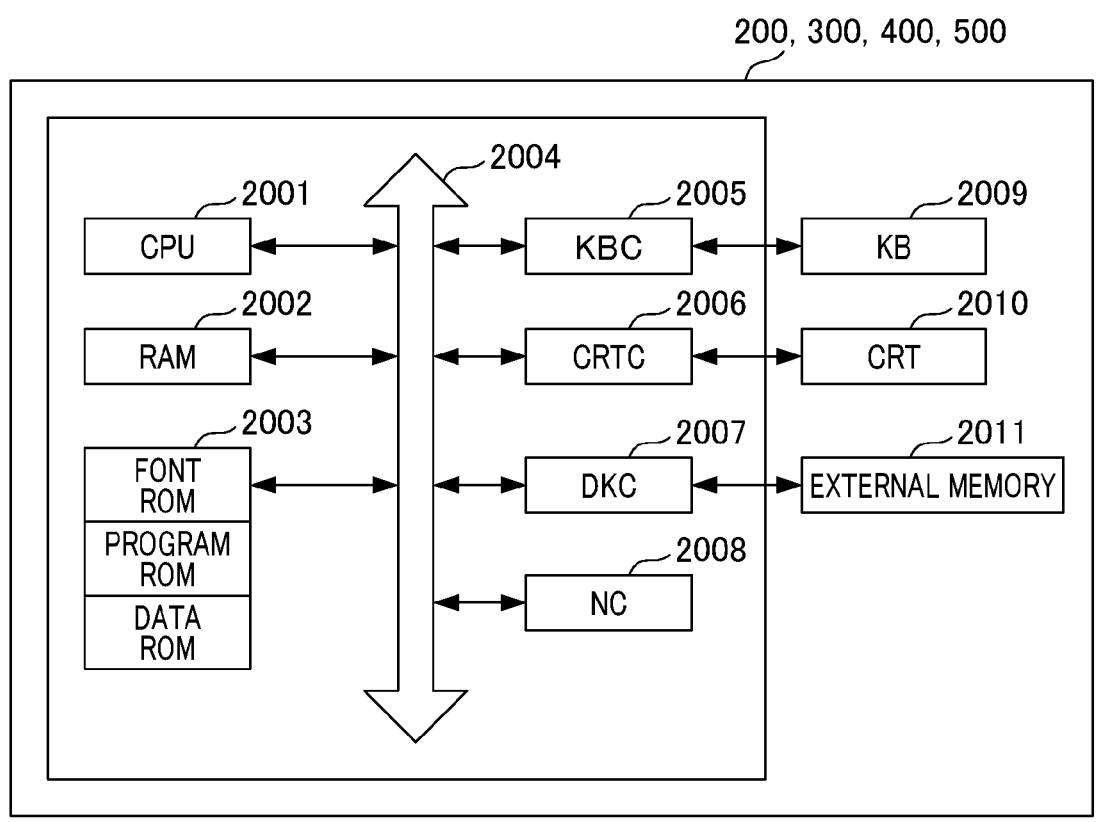
FIG. 2 is a diagram illustrating a hardware configuration of an authorization server, a resource server, a terminal, and a device.

FIG. 2 is a diagram illustrating a hardware configuration of the authorization server, the resource server, the terminal, and the device.

A hardware configuration of a general information processing apparatus may be applied to the servers, the terminal, and the device. A virtual hardware configuration of an information processing apparatus which is provided as an infrastructure as a service (IaaS) may be applied to the servers.

In FIG. 2, a central processing unit (CPU) 2001 executes a program such as an OS or an application stored in a program ROM of a ROM 2003 and controls blocks connected to a system bus 2004. The CPU 2001 executes a program loaded into a RAM 2002 from an external memory 2011 such as a hard disk (HD) and controls blocks. The OS is an abbreviation for an operating system which is started in a computer and the operating system is referred to as an OS. Processes of sequences to be described below can be realized by causing the CPU 2001 to execute a program. The ROM is an abbreviation of a read only memory and the RAM is an abbreviation of a random access memory.

The RAM 2002 functions as a main memory, a work area, or the like of the CPU 2001. A keyboard controller (KBC) 2005 controls a key input from a keyboard 2009 or a pointing device which is not illustrated. A CRT controller (CRTC) 2006 controls of display of the CRT display 2010. A disk controller (DKC) 2007 controls data access in the external memory 2011 such as a hard disk (HD) which stores various types of data. A network controller (NC) 2008 performs a communication control process with another device connected thereto via the WAN 100 and the LAN 101.

When virtual information processing is assumed to be provided as the IaaS, the KBC 2005, the CRTC 2006, and the like are not provided and the virtual information processing is operated from the keyboard 2009 of the terminal connected via the NC 2008 or the CRT display 2010. In the following description, a main constituent of hardware for execution in the server or terminal and the device is the CPU 2001 and a main constituent of software is an application program installed in the external memory 2011, unless mentioned differently.

Figure 3A:
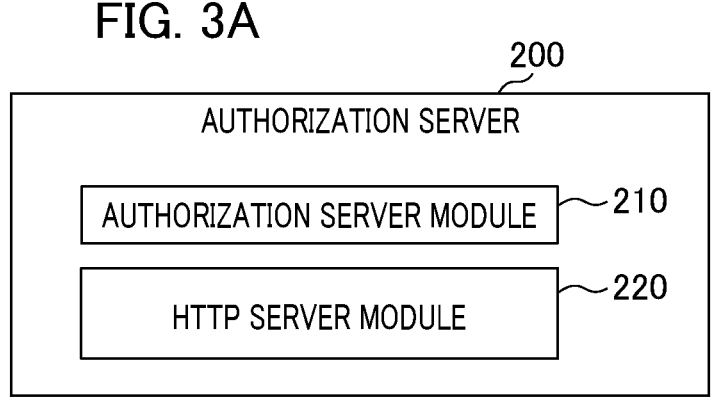
FIGS. 3A to 3C are examples of functional block diagrams of the authorization server, the resource server, and the device.
Figure 3B:
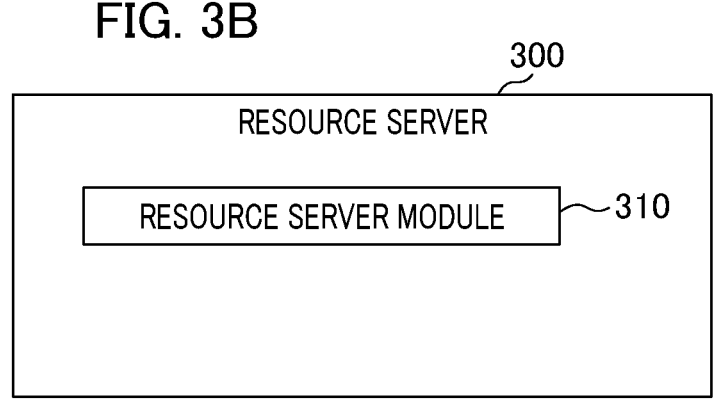
Figure 3C:
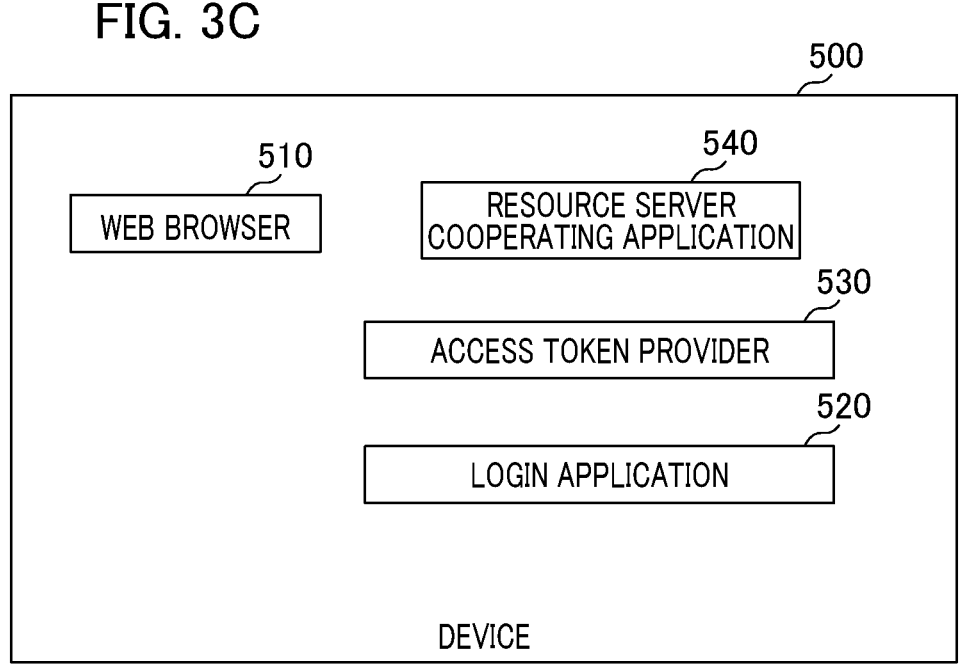

FIGS. 3A to 3C are examples of functional block diagrams of the authorization server, the resource server, and the device.

FIG. 3A illustrates a configuration of the authorization server 200. The authorization server 200 includes an authorization server module 210 and an HTTP server module 220. The HTTP server module 220 is a module that performs HTTP communication with the web browser 410 which is installed in the terminal 400 connected via the WAN 100 and the web browser 510 which is installed in the device 500. The HTTP server module 220 is configured to communicate by SSL/TLS and includes a certificate store which is not illustrated. In this embodiment, when a client registration request to be described below is received, the HTTP server module 220 requests a request source to authenticate a client.

The authorization server module 210 is a web application which operates over the HTTP server module 220 or operates in cooperation with the HTTP server module 220. The authorization server module 210 receives, processes, and answers a request from the web browser 410 or 510 via the HTTP server module 220. In this embodiment, when an authorization request to be described below is received, the authorization server module 210 requests a request source to authenticate a user using a user ID and a password. In the following description, a process of causing the authorization server module 210 to communicate with a web browser via the HTTP server module 220 will refer to that the web browser and the authorization server module 210 communicate with each other unless description of an SSL/TLS is not required.

When user authentication is received and authentication of a request source succeeds, the authorization server module 210 generates an authentication token associated with the authenticated user information and transmits the authentication token as a response to the web browser 410 or 510. The authentication token is a token for verifying whether a user is authenticated and logs in or whether a user is authenticated. It is possible to identify a user using the authentication token. An authorization code to be described below is different from the authentication token. The authorization code is a token indicating that a client to be subjected to an authorization operation by the authenticated user is authorized to access instead of the user with the user's authority in Authorization Code Grant of OAuth 2.0.

In case of Authorization Code Grant, an authorization token is acquired using the authorization code and is transmitted when the client uses a public API of the cloud service. The authorization token is a token indicating that authority of the user who has performed the authorization operation is delegated to the client. The authorization token is different from the authentication token. It is remarkable that the authentication token is used to confirm a user but the authorization token is used to confirm the authority. A refresh token is a token which is acquired using the same authorization code and indicates that the authorization token can be reissued. The authorization token in case of Client Credentials Grant is a token indicating a client's own authority.

The authorization server module 210 receives, processes, and answers an authorization token verifying process from a resource server module 310 via the LAN 101. The authorization token verifying process may be configured as a remote procedure call (RPC). The authorization token verifying process may be configured as an API of a web service which can communicate in the LAN 101 via the HTTP server module 220 or via the WAN 100.

FIG. 3B illustrates a configuration of the resource server 300. The resource server 300 includes a resource server module 310. The resource server module 310 may be configured to operate over the HTTP server module which is not illustrated. The resource server module 310 includes an API which is opened as a web service and receives, processes, and answers a resource request from the device 500. The resource server module 310 requests the authorization server module 210 to perform the authorization token verifying process to be described below via the LAN 101 or the WAN 100.

FIG. 3C illustrates a configuration of the device 500. The CPU 2001 (FIG. 2) of the device 500 controls applications by executing the OS stored in the ROM 2003 or the external memory 2011.

The device 500 includes a web browser 510, a login application 520, an access token provider 530, and a resource server cooperating application 540. The web browser 510 is a user agent for using the WWW system.

The login application 520 has a function of authenticating a user of a device. The login application 520 displays a screen (not illustrated) for receiving a user ID and a password from a user. The login application 520 verifies whether a set of the user ID and the password input via the screen matches data stored in advance in the device 500. When the verification result is positive, the login application 520 has a function of authenticating a user by generating a login context including stored user information. The login application 520 acquires IC card information from an IC card reader, which is not illustrated, connected to the device 500 and verifies whether the acquired IC card information matches IC card information stored in the device 500.

When the verification result is positive, the login application 520 may have a function of authenticating a user by generating a login context including corresponding user information. The login application 520 may cooperate with a single sign-on server, which is not illustrated, connected thereto via the WAN 100 in a communicable manner to realize user authentication using a single sign-on protocol such as SAML or OpenID Connect The access token provider 530 cooperates with the authorization server 200 via the WAN 100 to register a client or acquire an authorization token as will be described below. At this time, the access token provider 530 is configured to communicate with the web browser 510 or the web browser 410 of the terminal 400 and performs Authorization Code Grant of OAuth 2.0. The access token provider 530 can provide the acquired authorization token in response to a request from the resource server cooperating application 540 to be described below.

The access token provider 530 includes a client certificate in the X.509 form and a private key thereof as vendor default credentials for certificating itself. The access token provider 530 uses the client certificate and the private key to set up communication with the HTTP server module 220 of the authorization server 200, whereby the access token provider 530 is authenticated.

The resource server cooperating application 540 is configured to call a public API of the resource server 300 using the authorization token acquired from the access token provider 530. The resource server cooperating application 540 is configured to operate when various events occur in the device 500. For example, the resource server cooperating application 540 operates when a user logs in using the login application 520 or when a sensor or an application of the device 500 detects a variation. For example, when the device 500 is a printer, an event occurs and the resource server cooperating application 540 operates, when a print request is received from the terminal 400 or when printing is completed.

FIG. 4 is a diagram illustrating a client registering process which is performed in common in the first, second, and third modes.

This sequence represents a process of registering a client in the authorization server module 210 from the device 500. A client which is registered in this sequence is referred to as a vendor client for the purpose of distinction from a tenant-dedicated client to be described below.

In S1.1, the access token provider 530 of the device 500 transmits a vendor client registration request to the HTTP server module 220 of the authorization server 200. A time at which the access token provider 530 transmits the vendor client registration request is set to a time at which a user first starts the access token provider 530 using the device 500 in this embodiment. As another time, a time at which a user selects the function of the access token provider 530 and a resource request to the resource server 300 is generated is considered. As another time, a time at which the access token provider 530 has an explicit starting operation and a user performs the operation using the device 500 is considered.

The vendor client registration request includes, a client name, a redirect URL for using Authorization Code Grant, and a device serial ID for individually identifying the device 500. The vendor client registration request may be configured to include a character string for describing a client or additional information such as an URL of a site in which description is listed as other information. The vendor client registration request includes information common to the access token providers 530 of certain devices and does not include information on a user including a tenant. This is because it is not clear to what user's tenant the access token provider 530 belongs in a step in which the access token provider 530 is started. This problem is solved in the second mode and the third mode. In the first mode, data on provision of a service cannot be associated with a user's tenant.

The HTTP server module 220 having received the vendor client registration request from the access token provider 530 starts negotiation of SSL/TLS communication. At this time, since a request for authentication of a client is set for the vendor client registration request, the access token provider 530 is requested to authenticate a client using vendor default credentials.

In S1.2, the HTTP server module 220 verifies acquired client authentication information using a certificate set in a certificate store which is not illustrated, and authenticates the access token provider 530 as a request source of the device registration. In this embodiment, as an authentication method of the request source of the vendor client registration request, an authentication method using a client certificate of SSL/TSL is used. As the authentication method, an ID and a password may be used as the vendor default credentials of Basic authentication or Digest authentication. The vendor client registration may be accepted by issuing an authorization token for registering a vendor client to an authenticated main constituent and verifying the authorization token. When the authentication fails, the HTTP server module 220 transmits an error as a response to the access token provider 530.

In S1.3, after authenticating the access token provider 530, the HTTP server module 220 transmits the vendor client registration request received from the access token provider 530 to the authorization server module 210. The HTTP server module 220 also transmits information for identifying the authenticated access token provider 530 (the acquired information of vendor default credentials).

In S1.4, the authorization server module 210 acquires the information of vendor default credentials transmitted as the authentication information from the HTTP server module 220. Then, in S1.5, the authorization server module 210 acquires an identifier included in the acquired information of vendor default credentials as a key. For example, the identifier is an identifier of an issuer, an identifier of a main constituent, a serial number, or the like in the case of a certificate of X.509. The authorization server module 210 includes a certificate management table, which is not illustrated, in which the keys and tenant IDs corresponding to the keys are registered.

The authorization server module 210 acquires a tenant ID associated with the key from the certificate management table. At this time, it may be configured to verify a starting date and time and an ending date and time of the vendor default credentials as a validated period. When a corresponding record is not present in the certificate management table or the verification of the validated period fails, the authorization server module 210 transmits an error as a response to the access token provider 530 via the HTTP server module 220.

In S1.6, the authorization server module 210 newly registers a vendor client in the client management table on the basis of the information acquired in response to the vendor client registration request and the acquired tenant ID. Specifically, the authorization server module 210 issues a client ID and a secret and stores the issued client ID and secret in the client management table. Hereinafter, the client ID which has been issued and registered therein is referred to as a vendor client ID for the purpose of distinction from a client ID of a tenant-dedicated client to be described below.

The authorization server module 210 stores the acquired client name, the acquired redirect URL, the acquired device serial ID, and the acquired tenant ID in the client management table. At this time, an ID indicating a vendor that provides the authorization server 200 is given as the tenant ID.

Table 1 shows an example of the client management table in a state in which a vendor client is newly registered.

TABLE 1

|  | Client ID | Secret | Tenant ID | Device serial ID | Redirect URI |
|---|---|---|---|---|---|
| Row 1 | c001@xx.com | xxxxxxxxxx | Vendor | DS10000003 | https://xx/res |

Authority which should be set as a default for the registered client may be set in advance in the certificate management table and the authority as a default may be given to the vendor client registered in S1.6 on the basis of the setting. After registration of the client is completed, the authorization server module 210 transmits the issued vendor client ID and secret as a response to the access token provider 530 via the HTTP server module 220 in S1.7. The vendor client registering process has been described hitherto.

The first mode, that is, one type of two types of modes using Client Credentials Grant, will be described below. This mode is a mode using the device serial ID as well as the client ID as information for identifying a device. In the first mode, first, an operation of associating the device serial ID and the tenant ID, that is, a registration operation to a tenant of a device, is required. As the method of registering a device, a method of inputting the device serial ID in the resource server 300 is considered. Details of the device registration will be described below. A user who registers a device is assumed to be a manager of the device or a user to which management is delegated, and the user works using the web browser 410 or 510 of the terminal 400 or the device 500.

The user accesses a device registration screen of the resource server module 310 using the web browser 410 or 510. When the access from the web browser 410 or 510 is received, the resource server module 310 verifies whether information transmitted from the web browser 410 or 510 includes a valid authentication token as an HTTP Cookie. When the HTTP Cookie includes an authentication token, the resource server module 310 transmits the authentication token to the authorization server module 210. When the HTTP Cookie does not include an authentication token, the following process is performed. The resource server module 310 transmits a response to the web browser 410 or 510 so as to redirect a login screen for authenticating a user, which is provided from the authorization server module 210.

Figure 5A:
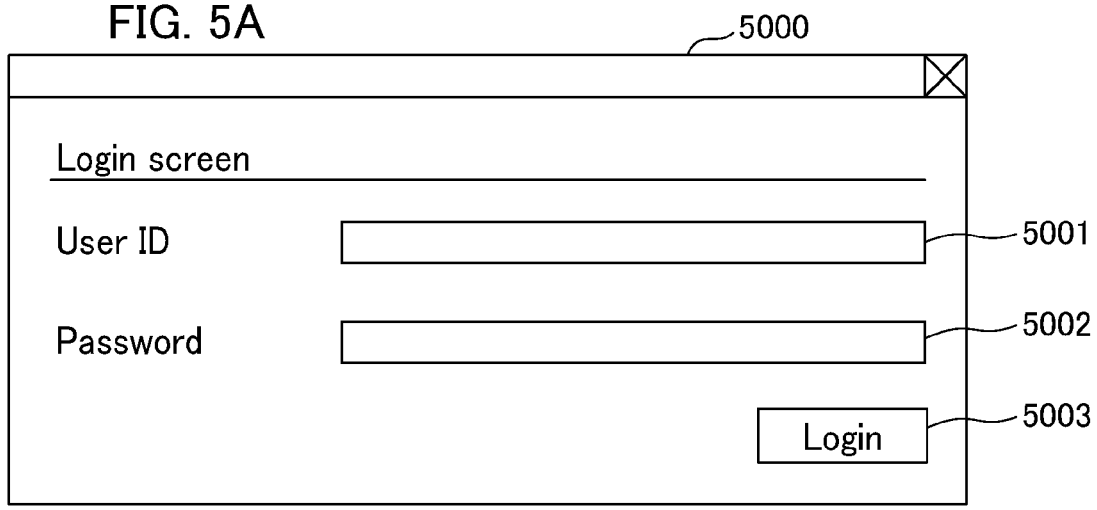
FIGS. 5A and 5B are diagrams illustrating examples of a login screen and a device registration screen.
Figure 5B:
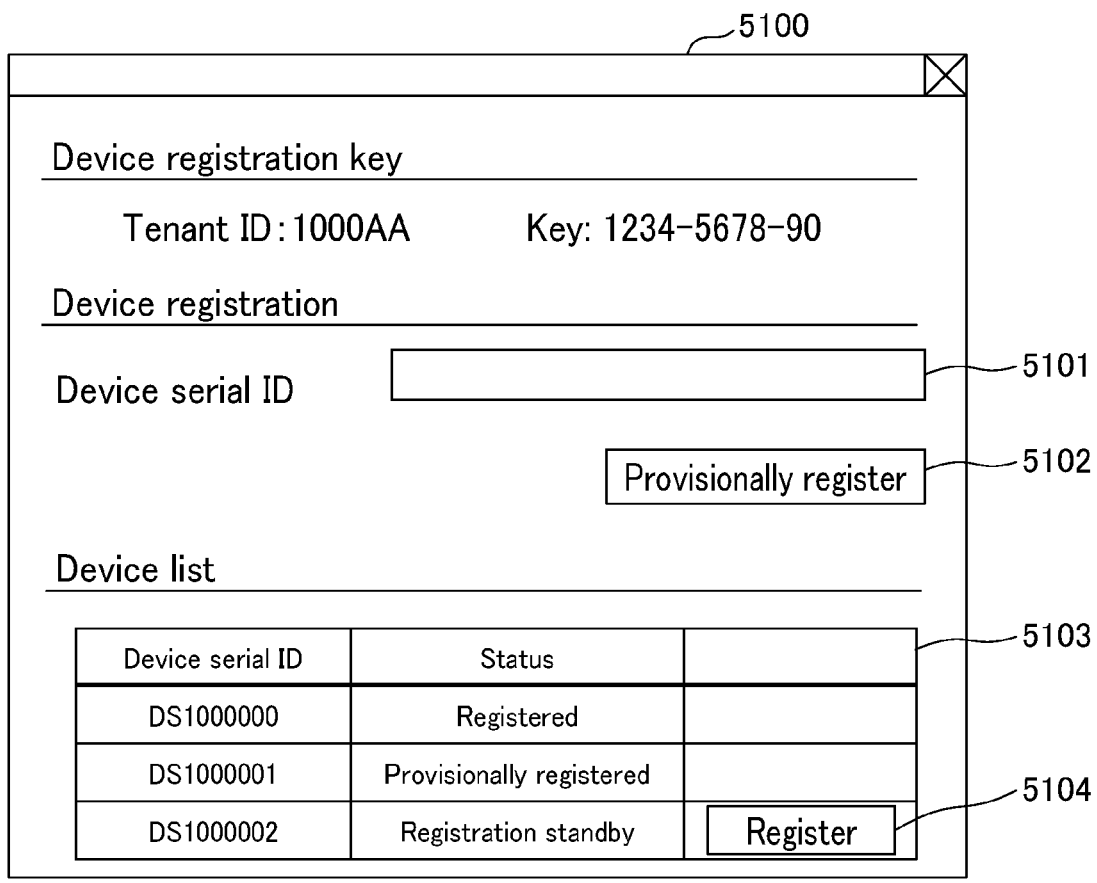

FIGS. 5A and 5B are diagrams illustrating examples of a login screen and a device registration screen.

FIG. 5A illustrates an example of a login screen for allowing a user to log in, which is generated by the authorization server module 210. In this example, a user inputs a user ID and a password and authentication thereof succeeds when the set of the user ID and the password matches a set of information registered in a user management table of the authorization server module 210 to be described below.

The login screen 5000 illustrated in FIG. 5A includes a user ID input box 5001 for inputting a user ID, a password input box 5002 for inputting a password, and a login button 5003 for performing a login operation.

A user inputs required information to the login screen 5000 displayed in the web browser 410 or 510 and pushes the login button 5003. The web browser 410 or 510 transmits the input information to the authorization server module 210. The authorization server module 210 acquires the user ID and the password and authenticates the user by comparing the acquired set of the user ID and the password with an information set of a user ID and a password in the user management table and verifying whether both sets match each other. Table 2 shows an example of the user management table of the authorization server module 210.

TABLE 2

| User ID | UUID | Password | Tenant ID |
|---|---|---|---|
| user@xx.com | 10000001 | user | 1000AA |

In this embodiment, a user ID "user@xx.com" and a password "user" are input to the login screen and the authorization server module 210 verifies the input data and performs authentication of the user. When the user authentication fails, that is, when the information is not registered in the user management table, the authorization server module 210 transmits an authentication error screen (not illustrated) as a response to the web browser 410 or 510.

When the user authentication succeeds, the authorization server module 210 generates an authentication token. The authentication token is stored in a nonvolatile memory of the authorization server module 210 in association with a user ID, a UUID corresponding to the user ID, and a tenant ID. The UUID is an abbreviation of universal unique identifier and is a unique ID which is not duplicated. In this embodiment, the authentication token is stored in association with the user ID "user@xx.com," the UUID "10000001," and the tenant ID "1000AA."

The authorization server module 210 transmits an authentication token as a response to the web browser 410 or 510. The authentication token is set as an HTTP Cookie and is set and transmitted as a response to the web browser 410 or 510 from the authorization server module 210. At this time, the authorization server module 210 transmits the response so as to redirect a device registration screen of the resource server module 310.

When an access from the web browser 410 or 510 is received, the resource server module 310 verifies whether the information transmitted from the web browser 410 or 510 includes a valid authentication token as the HTTP Cookie. When the HTTP Cookie includes an authentication token, the resource server module 310 transmits the authentication token to the authorization server module 210. The authorization server module 210 verifies whether the received authentication token is valid, and transmits the user ID, the UUID, and the tenant ID which are information associated with the authentication token as a response. In this example, the user ID "user@xx.com," the UUID "10000001," and the tenant ID "1000AA" are transmitted as a response.

When the authentication token is invalid, that is, is not stored in a nonvolatile memory of the authorization server module 210, information indicating this fact is transmitted as a response to the resource server module 310. Thereafter, when the web browser accesses the resource server module 310 or the authorization server module 210, a process of verifying and authenticating the authentication token in the authorization server module 210 and verification of the authentication token in the authorization server module 210 are performed.

FIG. 5B illustrates an example of the device registration screen for registering a device in a tenant, which is generated by the resource server module 310. The device registration screen is displayed in the web browser 410 or 510 which is used by a manager of the device or a user to which a management authority is delegated.

The device registration screen 5100 includes a device serial ID input box 5101 for inputting a device serial ID of a device to be registered and a registration button 5102 for registering a device. The registration process will be described below. The device registration screen 5100 includes a registered device list 5103 in which a list of devices registered in advance is displayed. Table 3 shows a device management table which is managed by the resource server module 310.

TABLE 3

| Tenant ID | Device serial ID | State |
|---|---|---|
| 1000AA | DS10000000 | Registered |
| 1000AA | DS10000001 | Registered |
| 1000AA | DS10000002 | Registered |

A user inputs a device serial ID of a device to be provisionally registered to the device serial ID input box 5101 of the device registration screen 5100 displayed in the web browser 410 or 510. In this embodiment, it is assumed that a device serial ID "DS10000003" is input. Then, the user pushes the registration button 5102. When the registration button 5102 is pushed, the web browser 410 or 510 transmits the device serial ID "DS10000003" and the authentication token to the resource server module 310. The resource server module 310 confirms whether the acquired device serial ID is not registered in the device management table. When the device serial ID is not registered in the device management table, the resource server module 310 stores the data along with the tenant ID "1000AA" associated with the authentication token in the device management table. Table 4 shows the device management table in a state in which the device with the device serial ID "DS10000003" is registered.

TABLE 4

| Tenant ID | Device serial ID | State |
|---|---|---|
| 1000AA | DS10000000 | Registered |
| 1000AA | DS10000001 | Registered |
| 1000AA | DS10000002 | Registered |
| 1000AA | DS10000003 | Registered |

By the above-mentioned process, the device with the device serial ID "DS10000003" is associated with the device with the tenant ID "1000AA."

API call from the device 500 to the resource server module 310 in a state in which the device serial ID and the tenant ID are associated will be described below. First, a trigger for performing API call is detection of a variation in a sensor or an instrument of the device 500. More specifically, for example, when the device 500 is a printer, the trigger for performing API call is a time at which printing is performed in response to a print request received remotely, a time at which an amount of remaining material such as ink or toner with which printing is performed decreases, or the like. When the device 500 is a smartphone, the trigger for performing API call is a time at which a call is carried out. When the device 500 is a device including a GPS, the trigger for performing API call is a time at which the device moves to a specific place or the like. A time at which biometric authentication of a user of the device 500 is carried out, a time at which a variation in heartbeat or the like occurs, and the like are considered as other triggers. When a variation in the sensor or the instrument of the device 500 is detected, the device 500 performs a sequence illustrated in FIG. 6.

FIG. 6 is a diagram illustrating a process of causing a device to call an API of a resource server module.

In S2.1, with detection of a variation in the device 500 as a trigger, the resource server cooperating application 540 requests the access token provider 530 for an authorization token. At this time, the resource server cooperating application 540 transmits the request with a scope "API" matching a public API of the resource server module 310 as an authority scope.

In S2.2, the access token provider 530 transmits an authorization token request to the authorization server module 210. The authorization token request includes the vendor client ID, the secret, and the scope "API" acquired from the resource server cooperating application 540.

In S2.3, the authorization server module 210 authenticates the vendor client. More specifically, the authorization server module 210 verifies whether the acquired set of the vendor client ID and the secret is registered in the client management table. When the set of the vendor client ID and the secret is registered in the client management table, the authentication of the vendor client succeeds. Subsequently, in S2.4, the authorization server module 210 issues an authorization token associated with the authenticated vendor client. More specifically, the authorization server module 210 issues an authorization token ID and manages the client ID (the vendor client ID) and the scope "API" of the token type "authorization token" in association with the authorization token ID in a token management table. Table 5 shows the token management table of the authorization server module 210.

TABLE 5

| | Token ID | Type | Client ID | User UUID | Redirect URI | Application ID | Scope |
|---|---|---|---|---|---|---|---|
| Row 1 | at_000000 | Authorization token | c001@xx.com | — | — | Token provider | API |

In addition, in the client management table shown in Table 1 above, the authorization server module manages the tenant ID "Vendor" and the device serial ID in association with the client ID. Therefore, the authorization server module manages the authorization token in association with the device 500 and the tenant via the token management table and the client management table.

In S2.5, the authorization server module 210 transmits the issued authorization token ID as a response to the access token provider 530. In S2.6, the access token provider 530 performs the following process using the acquired authorization token ID, the vendor client ID, the secret, and an application ID "APP0001" acquired from the resource server cooperating application 540. The access token provider 530 requests the authorization server module 210 to issue an application authorization token. At this time, the access token provider 530 requests the scope "API" acquired from the resource server cooperating application 540. The application authorization token is an authorization token with an application ID added as information associated with the authorization token ID. The access token provider 530 provides the application authorization token as a dedicated authorization token to the application having requested the authorization token.

In S2.7, the authorization server module 210 authenticates the vendor client, similar to the process in S2.3. In S2.8, the authorization server module 210 verifies whether the acquired authorization token ID is registered in the token management table. When the acquired authorization token ID is registered in the token management table, the authentication of the authorization token succeeds.

In S2.9, the authorization server module 210 issues an application authorization token which is associated with the authenticated vendor client and the acquired application ID. Specifically, the authorization server module 210 issues an authorization token ID. Then, the authorization server module 210 manages the token type "authorization token," the client ID (the vendor client ID), the application ID "APP0001," and the scope "API" in associated with the authorization token ID in the token management table. Table 6 shows the token management table in a state in which the application authorization token is issued. The authorization server module manages the application authorization token in association with the tenant of the device 500 via the token management table shown in Table 6 and the client management table shown in Table 1.

TABLE 6

| | Token ID | Type | Client ID | User UUID | Redirect URI | Application ID | Scope |
|---|---|---|---|---|---|---|---|
| Row 1 | at_000000 | Authorization token | c001@xx.com | — | — | Token provider | API |
| Row 2 | at_000001 | Authorization token | c001@xx.com | — | — | APP0001 | API |

In S2.10, the authorization server module 210 transmits the issued application authorization token ID as a response to the access token provider 530. Subsequently, the access token provider 530 transmits the acquired application authorization token ID as a response to the resource server cooperating application 540.

In S2.12, the resource server cooperating application 540 calls a public API of the resource server module 310 using the acquired application authorization token. The API call includes information of the detected variation. For example, when the device 500 is a printer and the API is called with printing as a trigger, the API call includes a printed document name, a printing person, the number of prints, and information indicating that a print is color or monochrome.

In S2.13, the resource server module 310 requests the authorization server module 210 to verify the acquired application authorization token. In S2.14, the authorization server module 210 verifies whether the acquired application authorization token is registered in the token management table. When the application authorization token is registered in the token management table, the authorization server module 210 performs the following process. The authorization server module 210 transmits the vendor client ID, the device serial ID, and the tenant ID as information associated with the application authorization token ID with reference to the token management table and the client management table.

In S2.15, the resource server module 310 confirms the acquired tenant ID as a process based on the device registration API. When the tenant ID has a value indicating a "vendor," the resource server module 310 performs the following process. The resource server module 310 confirms whether the acquired device serial ID is registered in the device management table. When the device serial ID is registered in the device management table, the resource server module acquires a tenant ID associated with the device serial ID. Then, the resource server module 310 treats a variety of information received at the time of API call and detected from the device 500 as information of the tenant ID associated with the device serial ID. More specifically, for example, the information is stored in a nonvolatile memory in a format which can be referred to by only a user belonging to the tenant ID. For example, an electronic mail is transmitted to a user belonging to the tenant ID. What process should be performed is defined for each public API. Subsequently, in S2.16, the resource server module 310 returns a response of the API to the resource server cooperating application 540 and ends the process. The process of transmitting the information of the device 500 to the cloud service, that is, the public API of the resource server module 310 in the first mode has been described hitherto.

In this embodiment, a process example of associating the device serial ID and the tenant ID by directly registering the device serial ID in the resource server module 310 has been described above, but the association of the device serial ID and the tenant ID may be realized using another process. For example, a configuration in which a key for registering a device is issued for each tenant ID, the key is input to the device, and the device transmits the key along with its own device serial ID to the resource server module 310 may be employed. In this configuration, the tenant ID associated with the key is registered in the resource server 300 in association with the device serial ID. A configuration in which a management server (not illustrated) that manages a device serial ID is provided, the management server manages information on association of the device serial ID and the tenant, and the resource server module 310 acquires information of the tenant by communication may be considered.

A configuration in which the device serial ID and the tenant ID are associated using an authorization token issued in Authorization Code Grant which is used in the second mode to be described below may be employed. When this configuration is employed, a tenant ID of a tenant to which a user having delegating authority by Authorization Code Grant belongs is associated with a device serial ID associated with a vendor client to which the authority is delegated.

In the first mode, the device serial ID for identifying the device 500 is used to associate the device 500 with the tenant to which a user of the device 500 belongs. Accordingly, the following problems are caused. It is assumed that the user of the device 500 is changed to a user of another tenant by recycling. Then, there is no problem when the resource server module 310 is notified and notified data from the device 500 which is stored in the resource server module 310 is deleted. However, when the resource server module 310 is not notified, there is a risk that data when a new user uses the device 500 will be stored in association with the tenant ID of the old user associated with the device serial ID. As a result, there is a risk that confidential information or personal information of the new user will leak to a user of another tenant. The problem in the first mode has been described hitherto.

The second mode will be described below. In the second mode, a user delegates its authority to the access token provider 530 which is a vendor client using Authorization Code Grant. The resource server module 310 stores data relevant to provision of a service in association with a tenant ID to which the user having delegated the authority belongs.

In the second mode, first, a flow in which the user delegates its authority to the access token provider 530 is required. As a time at which the flow for delegating the authority is started, the following two patterns are considered. A first pattern is a pattern in which the flow for delegating the authority is started by causing the user to access a site which is provided by the access token provider 530 using the web browser 410 or 510. A second pattern is a pattern in which the flow is started by causing the resource server cooperating application to access a site which is provided by the access token provider 530 using the web browser 510 when the user operates the resource server cooperating application.

FIG. 7 is a diagram illustrating a process when authority delegation is started.

The user management table and the client management table of the authorization server module 210 are the same as described in the first mode. In this embodiment, it is assumed that a user uses the user ID "user@xx.com" and the password thereof. The access token provider 530 stores a secret and a redirect URI which are a variety of data of the vendor client ID c001@xx.com. The redirect URI is a URI for causing the access token provider 530 to receive an authorization response. The variety of data is registered in the authorization server module 210 by the vendor client registering process which is described above with reference to FIG. 4.

In S3.1, the web browser 410 or 510 transmits an authority delegation start request to the access token provider 530. In S3.2, the access token provider 530 having received the authority delegation start request transmits an authorization request to the authorization server module 210 via the web browser 410 or 510. The processes of issuing the authorization token and the refresh token from the authorization request of S3.3 to the authorization token response and the refresh token response of S3.20 are performed in accordance with the Authorization Code Grant flow defined in OAuth 2.0. The authorization request includes at least the vendor client ID "c001@xx.com", the redirect URI https://xx/res, and the scope "resource" which are stored in the access token provider 530. The scope "resource" indicates a scope of resources on which the authority is delegated from the user to the access token provider 530. The redirect URI is a URL of a vendor client which receives the authorization code issued from the authorization server 200 as described above.

In S3.3, the authorization server module 210 having received the authorization request from the web browser 410 or 510 verifies whether a valid authentication token as the HTTP Cookie is included in the information from the web browser 410 or 510. When a valid authentication token is included in the information from the web browser 410 or 510, the process of S3.9 is performed. When a valid authentication token is not included in the information from the web browser 410 or 510, the login process which has been described above with reference to FIG. 5A is performed as the processes of S3.10 to S3.7 and the authorization request in S3.3 is retransmitted in S3.8.

In S3.8, the authorization server module 210 having received the authorization request including the authentication token verifies whether the set of the client ID and the redirect URL is correct in the received authorization request in S3.9. More specifically, the authorization server module 210 verifies whether the set of the client ID and the redirect URI in the received authorization request matches a set of a client ID and a redirect URI registered in the client management table. When the set of the client ID and the redirect URI in the received authorization request does not match a set of a client ID and a redirect URI registered in the client management table, the authorization server module 210 transmits an error screen (not illustrated) as a response to the web browser 410 or 510. When the set of the client ID and the redirect URI in the received authorization request matches a set of a client ID and a redirect URI registered in the client management table, the authorization server module 210 transmits an authorization confirmation screen as a response to the web browser 410 or 510 in S3.10.

Figure 8A:
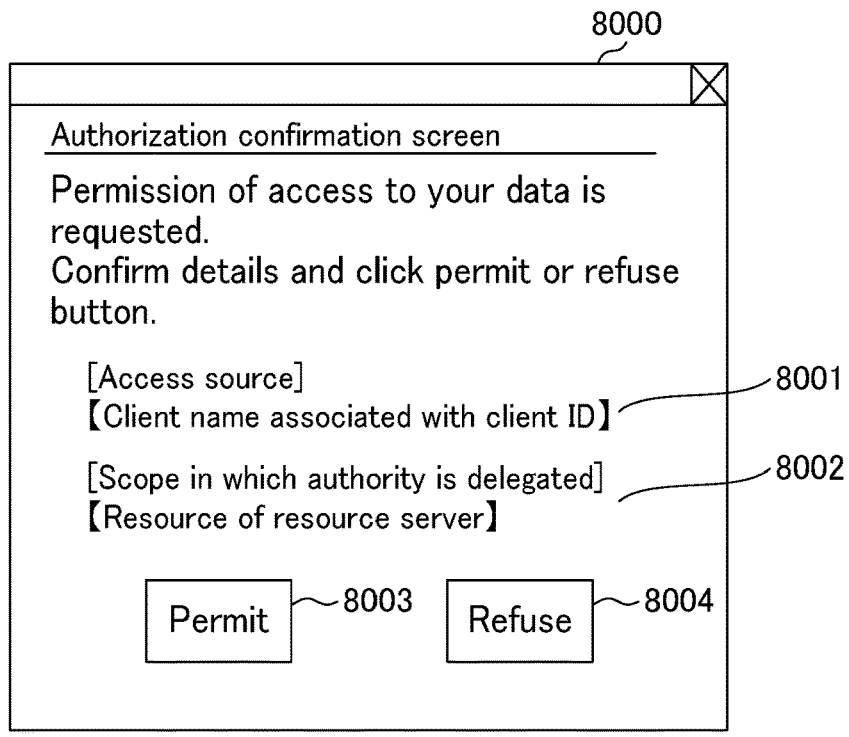
FIGS. 8A and 8B are examples of an authorization confirmation screen.
Figure 8B:
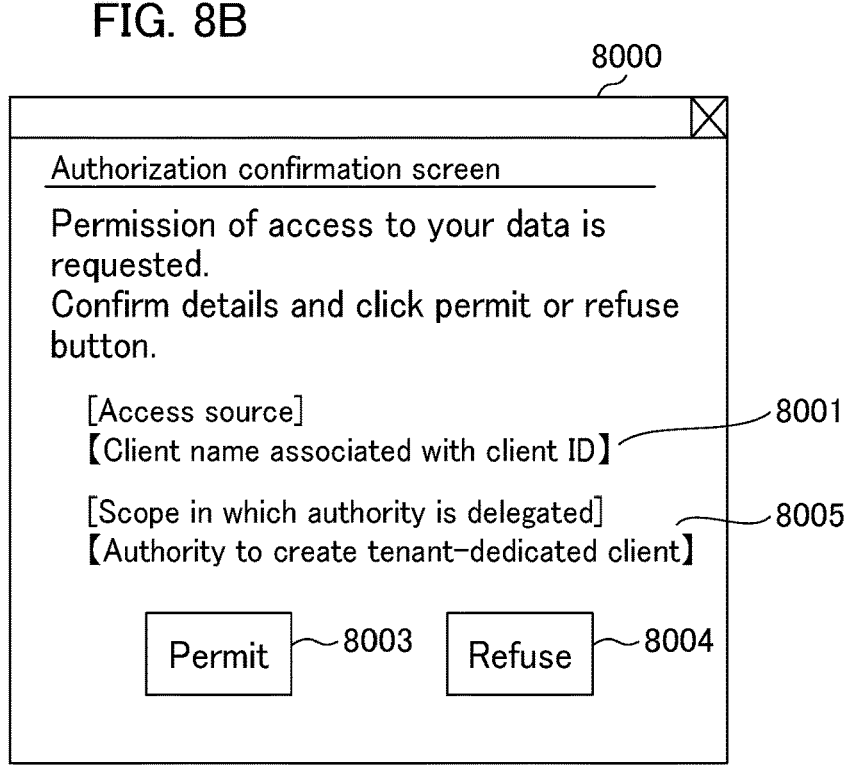

FIGS. 8A and 8B illustrate examples the authorization confirmation screen.

FIG. 8A illustrates an authorization confirmation screen in the second mode. The authorization confirmation screen 8000 includes an access source display area 8001 which is an area in which a client name 80001 acquired from the client management table using the client ID included in the authorization request as a key is displayed. The authorization confirmation screen 8000 further includes a delegated authority display area 8002 which is an area in which explanation corresponding to the scope acquired using the authorization request. Since "resource" is requested as the scope in this time, resources of the resource server are presented as the authority delegation scope in this screen example. The authorization confirmation screen 8000 includes a permit button 8003 for causing the user to perform an authorization operation on details of the information and a refuse button 8004 for causing the user to refuse.

FIG. 7 will be referred to again. In S3.11, the user pushes the permit button 8003 to perform an authorization operation. In S3.12, the web browser 410 or 510 transmits an authorization confirmation result to the authorization server module 210. In S3.13, the authorization server module 210 issues an authorization code. More specifically, the authorization server module 210 issues a token ID "cd_000001." The authorization server module 210 registers the vendor client ID "c001@xx.com," the redirect URI "https://xx/res," the scope "resource," and the UUID "10000001" included in the authorization request in the token management table. The UUID "10000001" is a UUID corresponding to the user ID of the user which is authenticated. At this time, the token type is assumed to be the authentication code. A date and time of a deadline in which the authorization code is valid may be registered as a validated period which is an item which is not illustrated. A status indicating whether the token is valid may be registered. In this case, it is verified whether it passes the valid period and whether the status is valid. Table 7 shows an example of the token management table of the authorization server module.

TABLE 7

|  | Token ID | Type | Client ID | User UUID | Redirect URI | Application ID | Scope |
|---|---|---|---|---|---|---|---|
| Row 1 | cd_000001 | Authorization token | c001@xx.com | 10000001 | https://xx/res | Token provider | Resource |

In S3.14 and S3.15, the authorization server module 210 allocates the token ID "cd_000001" of the issued authorization code. The authorization server module 210 transmits an authorization response to the access token provider 530 via the web browser 410 or 510. More specifically, the authorization server module 210 transmits a redirect response to the web browser 410 or 510 so as to redirect the redirect URI "https://xx/res" acquired at the time of transmitting the authorization request.

In S3.16, the access token provider 530 transmits an authorization token request to the authorization server module 210. The authorization token request includes at least the authorization code "cd_000001," the vendor client ID "c001@xx.com," the secret "xxxxxxxxxx," and the redirect URI "https://xx/res" transmitted at the time of transmitting the authorization request.

In S3.17, the authorization server module 210 authenticates the client using a set of the acquired vendor client ID "c001@xx.com" and the acquired secret "xxxxxxxxxx." More specifically, when the set of the vendor client ID and the secret is present in the client table, the client authentication succeeds. When the client authentication fails, the authorization server module 210 transmits an authentication error as a response to the access token provider 530. When the client authentication succeeds, the process of S3.18 is performed.

In S3.18, the authorization server module 210 verifies the acquired authorization code "cd_000001." Specifically, the authorization server module 210 verifies whether the acquired authorization code is registered in the token management table and verifies whether the authorization code is valid when the acquired authorization code is registered in the token management table. When the authorization code is valid, the authorization server module 210 performs the following verification using the vendor client ID "c001@xx.com" and the acquired secret "xxxxxxxxxx" which are acquired from the authorization token request. The authorization server module 210 verifies whether the vendor client ID and the redirect URI match the vendor client ID and the redirect URI registered in the token management table. When the vendor client ID and the redirect URI match the vendor client ID and the redirect URI registered in the token management table, the verification result of the authorization code is valid.

When the verification result of the authorization code is invalid, the authorization server module 210 transmits an error response to the access token provider 530. When the verification result of the authorization code is valid, the authorization server module 210 issues an authorization token in S3.19. Specifically, the authorization server module 210 issues a token ID "at_000001." The authorization server module 210 registers the UUID "10000001" of the user, the scope "resource," and the authenticated vendor client ID "c001@xx.com" associated with the authorization code in the token management table. At this time, the authorization server module 210 sets the token type to an authorization token and registers a date and time of a deadline in which the authorization token is valid as a validated period.

In S3.20, the authorization server module 210 issues a refresh token. More specifically, the authorization server module 210 issues a token ID "rt_000001." The authorization server module 210 registers the UUID "10000001" of the user associated with the authorization token "at_000001," the scope "resource," and the authenticated vendor client ID "c001@xx.com" in the token management table. At this time, the token type is set to the refresh token. A date and time of a deadline in which the refresh token is valid may be registered as a validated period. In OAuth 2.0, it is recommended that an authorization code can be used only one time. Accordingly, the authorization server module 210 sets the authorization code status of the token ID "cd_000001" to "invalid." As the method of invalidating the authorization code status, a method of invalidating the authorization code status by updating the validated period to a data and time in the past or invalidating the authorization code status by deleting a record of a table may be used instead of using the status. Table 8 in FIG. 13 shows the token management table of the authorization server module. In Table 8, the hatched row indicates an invalidated record.

In S3.21, the authorization server module 210 transmits the token ID "at_000001" of the issued authorization token and the token ID "rt_000001" of the refresh token to the access token provider 530. The flow in which the user delegates authority to the access token provider 530 using Authorization Code Grant in OAuth 2.0 has been described hitherto.

The access token provider 530 stores the acquired refresh token in a nonvolatile memory. At this time, the access token provider 530 stores the refresh token in association with the application ID. Accordingly, it is possible to extract the refresh token using a request from an application indicated by the application ID, that is, the resource server cooperating application 540.

A configuration in which the authorization server module 210 stores the refresh token in association with a login context generated by the login application 520 of the device 500 may be employed. When the user logs in to the device 500 again, the authorization server module 210 may extract the stored refresh token on the basis of the login context. When the flow of delegating authority is started with an operation of the second pattern, that is, the resource server cooperating application 540, as a trigger, the application authorization token may be issued and transmitted as a response using the acquired authorization token.

The method of associating the device 500 with the tenant ID will be described below. Here, following two type of methods are considered as the method of associating the device 500 with the tenant ID in the second mode. In the first method, the access token provider 530 issues an authorization token using the refresh token stored therein and issues an application authorization token from the authorization token. Similar to the first mode, the resource server module 310 associates the device serial ID with the tenant ID using the user's tenant ID associated with the application authorization token. The first method in the second mode is different from the first mode only in the device registering method and has the same problem as in the first mode because information used to associate the device with the tenant is the device serial ID of the device.

The second method is a method of issuing an application authorization token every time using the refresh token stored in the access token provider 530 and using a user's tenant ID associated with the application authorization token. The second method is different from the first mode or the first method of the second mode in the time at which the device and the tenant are associated with each other. In the first mode or the first method of the second mode, the device serial ID and the tenant ID are associated in advance and then the device 500 independently starts the API call to the resource server module 310. In the second method of the second mode, a tenant ID is specified every time using the user's tenant ID associated with the application authorization token used for the API call to the resource server instead of associating the device serial ID with the tenant ID and the process is performed. Details thereof will be described below.

First, a trigger for performing the API call varies depending on the configuration in which the refresh token is stored in the access token provider 530. When the refresh token is stored in association with the application ID, the API call in the second method is performed with the same trigger as in the first mode. On the other hand, when the refresh token is stored in association with the login context, the trigger for performing the API call is limited to a case in which the user operates the device 500 in a state in which the user logs in to the device 500.

When the device 500 is a copying machine, the trigger for performing the API call is, for example, a time at which the device 500 operates a copying operation. When the device 500 is a smartphone, the trigger for performing the API call is a time at which a call is carried out or the like. When the device 500 is a device including a GPS, the trigger for performing the API call is a time at which the device moves to a specific place. In addition, a time at which biometric authentication of the user of the device 500 is performed or a time at which a variation in heartbeat or the like occurs may be set as the trigger for performing the API call.

Figure 9:
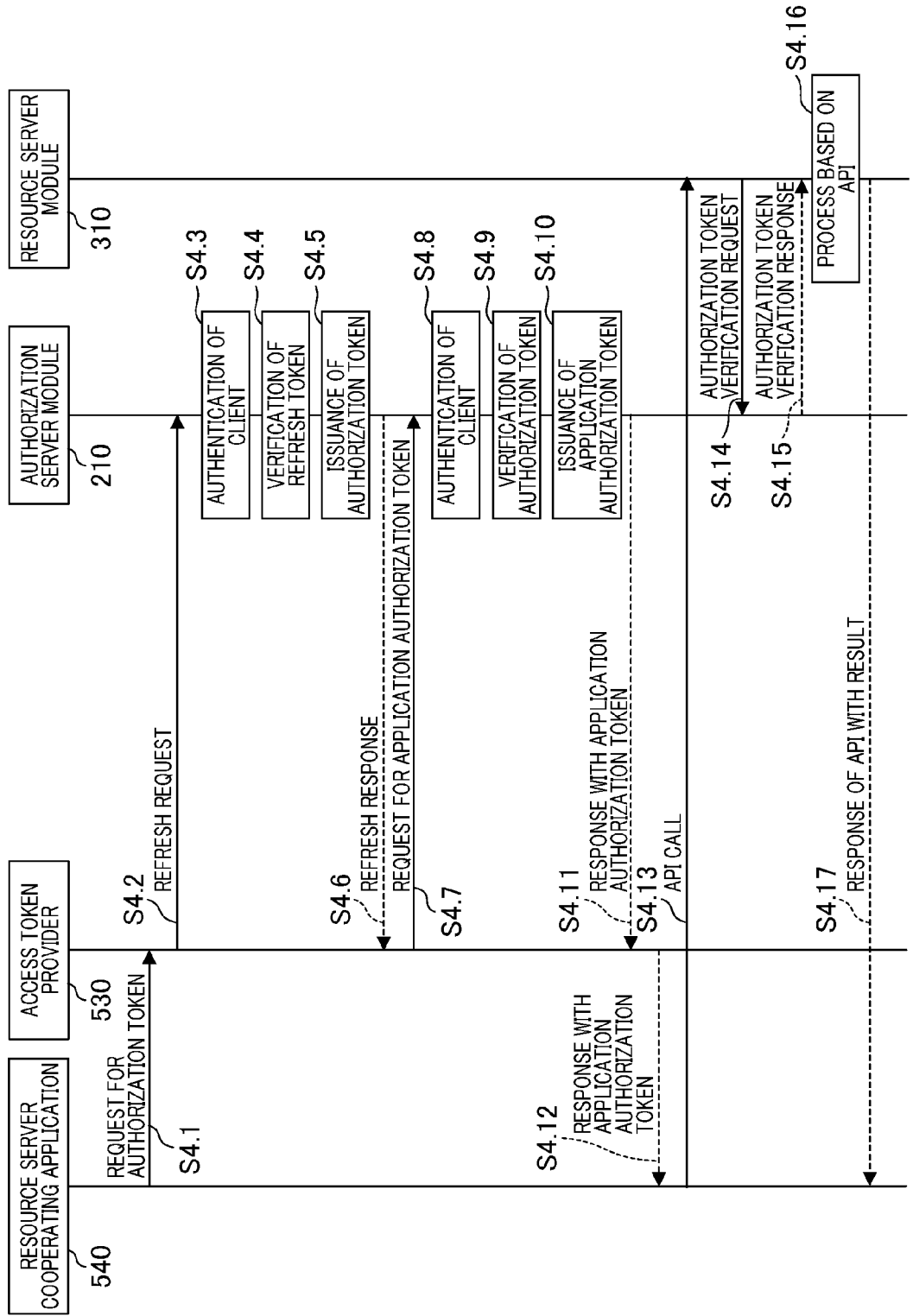
FIG. 9 is a diagram illustrating a process of calling an API of a resource server module.

FIG. 9 is a diagram illustrating a process of causing the device to call the API of the resource server module.

With detection of a variation in the device 500 as a trigger, the resource server cooperating application 540 requests the access token provider 530 to transmit an authorization token in S4.1. At this time, the resource server cooperating application 540 requests a scope corresponding to the public API of the resource server module 310 as an authority scope.

Then, the access token provider 530 specifies and acquires a refresh token depending on the configuration in which the refresh token is stored. For example, when the refresh token is stored in association with a login context and the user logs in, the access token provider acquires the refresh token on the basis of the login context. When the refresh token is stored in association with the application ID, the access token provider acquires the refresh token on the basis of the application ID.

In S4.2, the access token provider 530 transmits a refresh request to the authorization server module 210. The refresh request includes the vendor client ID, the secret, and the acquired refresh token. In S4.3, the authorization server module 210 authenticates the vendor client in response to the refresh request. More specifically, the authorization server module 210 verifies whether a set of the acquired vendor client ID and the secret is registered in the client management table. Subsequently, in S4.4, the authorization server module 210 verifies the acquired refresh token. More specifically, the authorization server module 210 verifies whether the acquired refresh token is registered in the token management table and verifies whether the refresh token is valid when the refresh token is registered in the token management table. The authorization server module 210 verifies whether the vendor client ID "c001@xx.com" acquired in response to the refresh request matches the client ID in the token management table.

Then, in S4.5, the authorization server module 210 issues an authorization token. More specifically, the authorization server module 210 issues the token ID "at 000002." Then, the authorization server module 210 registers the UUID "10000001" of the user associated with the refresh token, the scope "API," and the authenticated vendor client ID "c001@xx.com" in the token management table. At this time, the token type is set to the authorization token and a date and time of a deadline in which the authorization token is valid is registered as a validated period. The authorization server module 210 may issue a new refresh token. At this time, the old refresh token is invalidated. Table 9 in FIG. 14 shows an example of the token management table of the authorization server module.

In S4.6, the authorization server module 210 transmits the token ID "at 000002" of the issued authorization token as a response to the access token provider 530. At this time, the authorization server module 210 transmits the new refresh token together when the new refresh token is issued. Thereafter, the processes of S4.7 to S4.12 are the same as the processes from S2.6 to S2.11 described above with reference to FIG. 6.

In S4.13, the resource server cooperating application 540 calls the public API of the resource server module 310 using the acquired application authorization token. The API call includes information of the detected variation in the device 500. For example, when the device 500 is a copying machine and the API is called with a copying operation as a trigger, the API call includes information such as a copying person, the number of sheets copied, or color or monochrome.

In S4.14, the resource server module 310 requests the authorization server module 210 to verify the acquired application authorization token. Subsequently, in S4.15, the authorization server module 210 verifies whether the acquired application authorization token is registered in the token management table. When the application authorization token is registered in the token management table, the authorization server module 210 returns the following information as information associated with the application authorization token ID. The authorization server module 210 transmits the UUID of the user, the user's tenant ID, the vendor client ID, the device serial ID, and the tenant ID of the vendor client as a response. The tenant ID of the vendor client is acquired from the client management table shown in Table 1. The user's tenant ID is acquired from the user management table shown in Table 2.

In S4.16, the resource server module 310 confirms the acquired user's tenant ID as a process based on the API. The resource server module 310 performs the following process using the user's tenant ID. The resource server module 310 treats a variety of information of the device 500 received at the time of the API call as information of the acquired user's tenant ID. For example, the resource server module 310 stores the information received at the time of the API call in the nonvolatile memory in a format which can be referred to by only the user belonging to the user's tenant ID. For example, the resource server module 310 transmits an electronic mail to the user belong to the user's tenant ID. What process should be performed is defined for each public API.

Then, in S4.17, the resource server module 310 returns a response of the API to the resource server cooperating application 540 and ends the process. Use of the service provided from the resource server module 310 using the second method of the second mode has been described hitherto.

As described above, the configuration in which the refresh token is stored in association with the login context among the configurations relevant to the second mode can be used only when the user operates the device 500. Accordingly, for example, the configuration cannot be used when information generated by a trigger not relevant to the user's login is transmitted. On the other hand, in the configuration in which the refresh token is stored in association with the application ID among the configurations relevant to the second mode, the user mediates to associate the device and the tenant. Accordingly, when the user stops use of the authorization server module 210, the configuration cannot be continuously used.

The third mode, that is, two types of modes using Client Credentials Grant, will be described below. The third mode is a most characteristic mode of this embodiment. The third mode is a mode in which a client ID and a secret for using Client Credentials Grant is dynamically issued using Authorization Code Grant. The third mode does not have the demerit of the first and second modes and thus is a mode having a lowest risk of leakage of information. The third mode will be described below with reference to FIG. 4 and FIGS. 6 to 9.

In the third mode, similar to the second mode, first, a user delegates its authority to the access token provider 530. Following two types of patterns are considered as a time at which a flow for delegating the authority is started. First, the first pattern is a pattern in which the flow is started with a user's access to a site in which the authority delegation is started in the access token provider 530 using the web browser 410 or 510 as a trigger. The second pattern is a pattern in which the flow is started with an access of the resource server cooperating application to a site of the access token provider 530 using the web browser 510 as a trigger when a user operates the resource server cooperating application. In the third mode, a subsequent processing method varies depending on the types of patterns, and the third mode will be described as a first method and a second method.

First, the first method of the third mode, that is, the method of starting the flow with the user's access to the site in which the authority delegation is started in the access token provider 530 using the web browser 410 or 510 as a trigger, will be described. A sequence when the authority delegation is started will be described below with reference to FIG. 7, but the same processes as described above with reference to FIG. 7 in describing the second mode will not be repeatedly described.

In S3.1 of FIG. 7, an authority delegation start request is transmitted from the web browser 410 or 510 to the access token provider 530. In S3.2, the access token provider 530 having received the authority delegation start request transmits an authentication request to the authorization server module 210 via the web browser 410 or 510.

The process of issuing the authorization token and the refresh token from the authorization request of S3.3 to the response of the authorization token and the refresh token of S3.20 is performed in accordance with the flow of Authorization Code Grant defined in OAuth 2.0. The authorization request includes at least the vendor client ID "c001@xx.com" stored in the access token provider 530, the redirect URI "https://xx/res," and the scope "tenant-dedicated client." The scope "tenant-dedicated client" indicates a scope of resources of which the authority is delegated from the user to the access token provider 530. The redirect URI is an URL of the vendor client having received the authorization code issued by the authorization server 200. The processes from S3.2 to S3.9 are the same as in the second mode and description thereof will not be repeated. In S3.10, the authorization server module 210 transmits authorization confirmation screen data as a response to the web browser 410 or 510. That is, the authorization server module 210 functions as a screen transmitting unit configured to transmit the authorization confirmation screen data to a terminal which is operated by the user in response to an authorization request.

FIG. 8B illustrates an example of an authorization confirmation screen displayed in the third mode.

The web browser 410 or 510 displays an authorization confirmation screen 8000 on the basis of the authorization confirmation screen data. The authorization confirmation screen 8000 includes an access source display area 8001. The access source display area 8001 is an area in which a client name 8001 acquired from the client management table using the client ID included in the authorization request as a key is displayed. The authorization confirmation screen 8000 also includes a delegated authority display area 8002. The delegated authority display area 8002 is an area in which explanation corresponding to the scope acquired in response to the authorization request is displayed. Since "tenant-dedicated client" is requested as the scope in this time, authority to create a tenant-dedicated client is displayed as the scope of authority delegation in this screen example.

The authorization confirmation screen 8000 includes a permit button 8003 which is used for a user to perform an authorization operation on details of the information displayed in the access source display area 8001 and the delegated authority display area 8002 and a refuse button 8004 which is used for the user to perform a refuse operation. The processes to S3.12 are the same as in the second mode. The user instructs permission of delegation of authority to create a tenant-dedicated client to the device 500 by pushing the permit button 8003. In this embodiment, the tenant corresponding to the tenant-dedicated client is a tenant to which the user having delegated the authority to create the tenant-dedicated client belongs.

In S3.13, the authorization server module 210 issues an authorization code. More specifically, the authorization server module 210 issues a token ID "cd_000001." Then, the authorization server module registers the vendor client ID "c001@xx.com" included in the authorization request, the redirect URI "https://xx/res," the scope "tenant-dedicated client", and the UUID "10000001" in the token management table. The UUID "10000001" corresponds to the user ID of the user who is authenticated. A date and time of a deadline in which the authorization code is valid may be registered as a validated period which is an item which is not illustrated.

A status indicating whether the token is valid may be registered to be "valid." When the status indicating whether the token is valid is registered, whether the status is valid instead of the validated period is verified. Table 10 shows an example of the token management table of the authorization server module after the process of S3.13.

TABLE 10

| | Token ID | Type | Client ID | User UUID | Redirect URI | Application ID | Scope |
|---|---|---|---|---|---|---|---|
| Row 1 | cd_000001 | Authorization code | c001@xx.com | 10000001 | https://xx/res | Token provider | Tenant-dedicated client |

In S3.14 and S3.15, the authorization server module 210 allocates the token ID "cd_000001" of the issued authorization code and transmits an authorization response to the access token provider 530 via the web browser 410 or 510. More specifically, the authorization server module 210 transmits a redirect response to the web browser 410 or 510 so as to redirect the acquired redirect URI "https://xx/res" at the time of the authorization request.

In S3.16, the access token provider 530 transmits an authorization token request to the authorization server module 210. The authorization token request includes at least the authorization code "cd_000001," the vendor client ID "c001@xx.com," the secret "xxxxxxxxxx," and the redirect URI "https://xx/res." The authorization token request also includes the scope "tenant-dedicated client."

Thereafter, up to S3.21, the same processes as in the second mode except that the scope set in various tokens is "tenant-dedicated client." The flow in which a user delegates authority to create a tenant-dedicated client to the access token provider 530 using Authorization Code Grant in OAuth 2.0 has been described hitherto. From the above description, the authorization server module 210 functions as a first issuing unit configured to issue an authorization token when a user instructs permission of delegation of the authority to create a tenant-dedicated client to the device 500 via the authorization confirmation screen. The access token provider 530 functions as a first acquisition requesting unit configured to perform the following process on the basis of first authentication information provided when a first client (a vendor client) is registered in the authorization server 200. The first authentication information includes a vendor client ID and a secret. The access token provider 530 transmits an acquisition request for first authorization information (an authorization token) indicating that the user's authority to create a second client (a tenant-dedicated client) is delegated to the device 500 as the vendor client (S3.16).

A process which is performed by the access token provider 530 using the authorization token acquired in S3.21 of FIG. 7 will be described below with reference to FIG. 4.

In S1.1, the access token provider 530 of the device 500 transmits a registration request for a tenant-dedicated client (a tenant-dedicated client registration request) to the HTTP server module 220 of the authorization server 200. The tenant-dedicated client registration request includes at least the authorization token acquired by the process described above with reference to FIG. 7.

The HTTP server module 220 having received the tenant-dedicated client registration request from the access token provider 530 skips the authentication of S1.2 and transmits the tenant-dedicated client registration request to the authorization server module 210 in S1.3. In S1.4, the authorization server module 210 acquires information of the authorization token transmitted as the authentication information from the HTTP server module 220. Then, in S1.5, the authorization server module 210 acquires information of a user's tenant ID which is associated with the authorization token in the token management table on the basis of the acquired authorization token. When a corresponding record is not present in the token management table, the authorization server module 210 transmits an error response to the access token provider 530 via the HTTP server module 220.

Then, in S1.6, the authorization server module 210 newly registers the tenant-dedicated client in the client management table. More specifically, the authorization server module 210 issues a client ID and a secret and stores the issued client ID and the issued secret in the client management table. Hereinafter, the client ID which has been issued and registered herein is an ID different from the vendor client ID of the premise. The authorization server module 210 stores the acquired tenant ID in the client management table. The tenant ID is a tenant ID to which the user having delegated the authority belongs. Table 11 shows an example of the client management table in which the tenant-dedicated client is newly registered.

TABLE 11

| | Client ID | Secret | Tenant ID | Device serial ID | Redirect URI |
|---|---|---|---|---|---|
| Row 1 | c001@xx.com | xxxxxxxxxx | Vendor | DS10000003 | https://xx/res |
| Row 2 | c002@1000AA | xxxxxxxxxx | 1000AA | DS10000003 | https://xx/res |

A configuration in which authority which should be set to a default for the registered tenant-dedicated client is set in the certificate management table and a default authority is allocated to the tenant-dedicated client registered in S1.6 on the basis of the setting may be employed. A configuration in which the authority which should be set to a default is defined as a scope and authority corresponding to the scope is allocated to the tenant-dedicated client by delegating authority of the scope together may be employed.

After registration of the tenant-dedicated client is completed, the authorization server module 210 transmits the issued tenant-dedicated client ID and the issued secret as a response to the access token provider 530 via the HTTP server module 220 in S1.7. The process of registering the tenant-dedicated client has been described hitherto.

The API call from the device 500 to the resource server module 310 after the tenant-dedicated client is issued will be described below.

First, the API call is performed with detection of a variation in a sensor or an instrument of the device 500 as a trigger. For example, when the device 500 is a printer, the trigger for performing the API call is a time at which a print request is remotely received and a printing job is performed, a time at which an amount of remaining material such as ink or toner with which the printer performs a printing job decreases, or the like. For example, when the device 500 is a smartphone, the trigger for performing the API call is a time at which a call is carried out or the like. For example, when the device 500 is a device including a GPS, a time at which the device moves to a specific place or the like is considered as the trigger. Otherwise, a time at which biometric authentication of the user of the device 500 is performed, a time at which a variation in heartbeat occurs, or the like is considered as the trigger. The device 500 detects the times and performs the following sequence.

The sequence of causing the device 500 to call the API of the resource server module 310 will be described below with reference to FIG. 6. The same part as in the sequence described above with reference to FIG. 6 will not be described and only differences therefrom will be described.

With detection of a variation in the device 500 as a trigger, the resource server cooperating application 540 requests the access token provider 530 to transmit an authorization token for the tenant-dedicated client in S2.1. At this time, the scope corresponding to the public API of the resource server module 310 is requested as an authority scope.

The processes from S2.2 to S2.11 are the same as the above-mentioned processes except for the scope. Specifically, in S2.6, the access token provider 530 requests the authorization server module 210 to issue an application authorization token using the authorization token ID, the tenant-dedicated client ID, the secret, and the application ID. That is, the access token provider 530 functions as a second acquisition requesting unit configured to transmit an acquisition request for second authorization information (an application authorization token) on the basis of the second authentication information (the tenant-dedicated client ID and the secret) provided from the authorization server. The application authorization token indicates that a specific authority on use of a service is delegated to the device 500 (the device as a tenant-dedicated client in this case).

In S2.9, the authorization server module 210 issues the application authorization token associated with the authenticated tenant-dedicated client and the authenticated application ID. The authorization server module 210 issues the authorization token ID and stores the token type "authorization token" and the client IDD "c001@1000AA" as the tenant-dedicated client ID in the token management table having the configuration of Table 10. The application authorization token is associated with the tenant-dedicated client ID and the tenant ID "1000AA" of the tenant to which the tenant-dedicated client belongs by the token management table and a client management table of Table 11.

In S.12, the resource server cooperating application 540 calls the public API of the resource server module 310 using the acquired application authorization token. That is, the resource server cooperating application 540 uses the service of the resource server 300 on the basis of the acquired application authorization token. The API call includes information of the detected variation in the device. For example, when the device 500 is a printer and the API is called with a printing job as a trigger, the API call includes information such as a printed document name, a printing person, the number of sheets printed, or color or monochrome.

In S2.13, the resource server module 310 requests the authorization server module 210 to verify the acquired application authorization token. In S2.14, the authorization server module 210 verifies whether the application authorization token is registered in the token management table. When the application authorization token is registered in the token management table, the authorization server module 210 performs the following process. The authorization server module 210 transmits the tenant-dedicated client ID and the tenant ID associated with the application authorization token ID as a response with reference to the token management table and the client management table. That is, the authorization server module 210 functions as an authorization unit configured to verify whether to permit the resource server cooperating application 540 to use a service with a specific authority on the basis of the application authorization token which is transmitted when the service is used.

In S2.15, the resource server module 310 confirms the tenant ID of the acquired tenant-dedicated client as the process based on the API. The resource server module 310 performs the following process using the tenant ID of the tenant-dedicated client. The resource server module 310 treats a variety of information received at the time of the API call and detected from the device 500 as information of the tenant ID associated with the acquired tenant-dedicated client. More specifically, for example, the resource server module 310 stores the information received at the time of the API call in a nonvolatile memory in a format which can be referred to by only a user belonging to the tenant ID. That is, the resource server module 310 functions as a storing unit configured to store data on provision of a service based on the application authorization token in association with the tenant-dedicated client. The resource server module 310 may transmit an electronic mail to a user belonging to the tenant ID of the tenant-dedicated client. What action should be performed is defined for each public API.

In S2.16, the resource server module 310 transmits an API response to the resource server cooperating application 540 and ends the process. Use of a service provided from the resource server module 310 using the first method of the third mode in the client registering process has been described hitherto.

The second method of the third mode will be described below. When a user operates the resource server cooperating application 540, the process is started with an access of the resource server cooperating application to a site in which authority delegation to the access token provider is started using the web browser of the device 500.

In the second method, first, an authorization token acquiring process using Authorization Code Grant in the first method described above with reference to FIG. 7 is performed. Then, the access token provider 530 performs the process illustrated in FIG. 10 using the authorization token acquired from the authorization server module 210.

Figure 10:
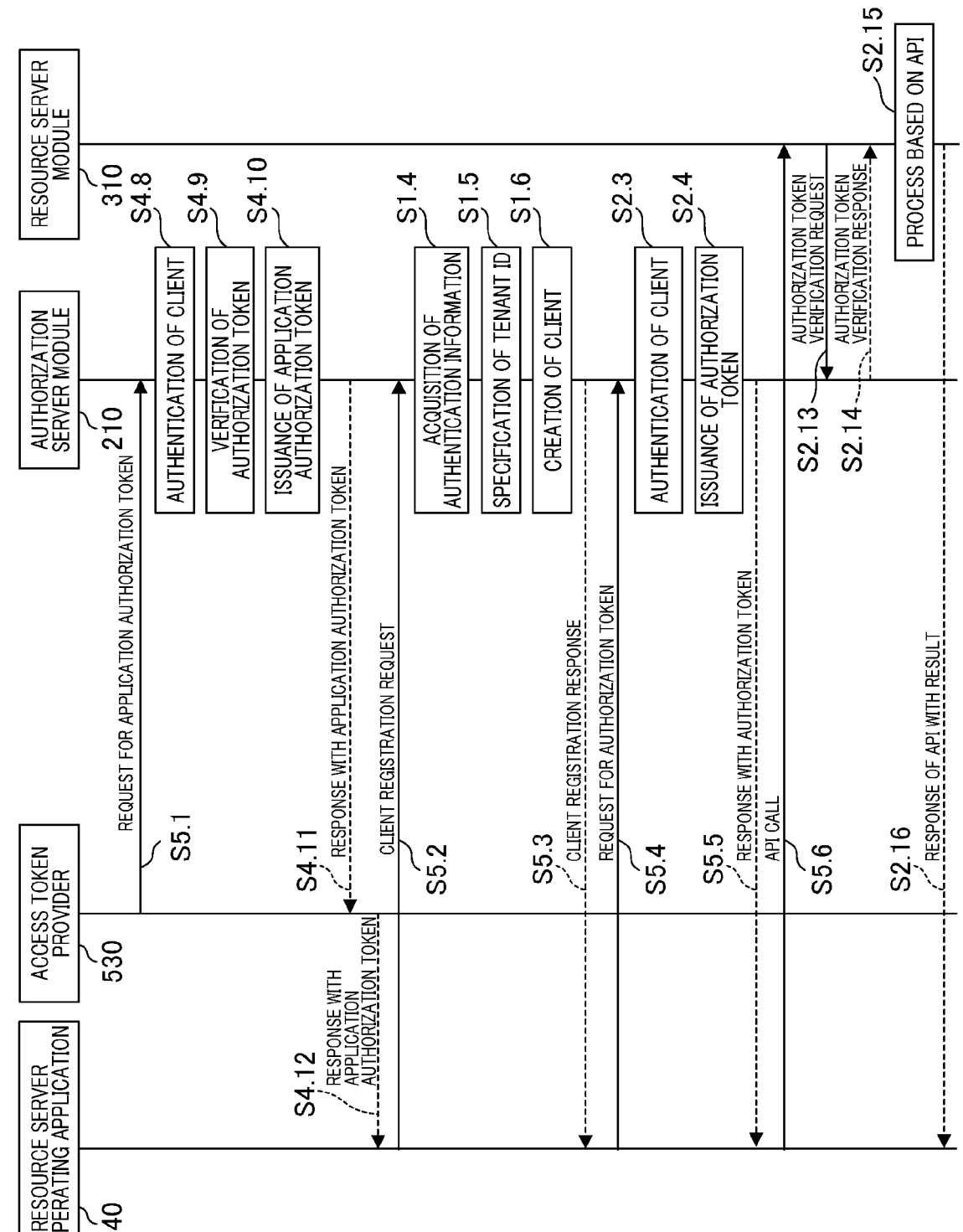
FIG. 10 is a diagram illustrating a process using an authorization token.

FIG. 10 is a diagram illustrating a process using the authorization token acquired from the authorization server module.

The processes of S4.8 to S4.12 in FIG. 10 are the same as the processes of S4.8 to S4.12 in FIG. 9 and description thereof will not be repeated.

In S5.1, the access token provider 530 performs the following process using the authorization token ID, the vendor client ID, the secret, and the application ID "APP0001" acquired from the resource server cooperating application 540. That is, the access token provider 530 requests the authorization server module 210 to issue an application authorization token. At this time, the scope "tenant-dedicated client" acquired from the resource server cooperating application 540 is requested. The application authorization token is an authorization token to which an application ID is added and is associated with the authorization token ID. The access token provider 530 provides the application authorization token to the resource server cooperating application 540 as a request source of the authorization token. Herein, the authorization token issuance request and the application authorization token issuance request are described as distinct sequences, but an application ID may be added at the time of transmitting the authorization token issuance request and the application authorization token may be acquired by a single sequence.

In S5.2, the resource server cooperating application 540 of the device 500 transmits the tenant-dedicated client registration request to the authorization server module 210. At this time, the acquired application authorization token is transmitted as authentication information. When the redirect URI is registered, the resource server cooperating application 540 registers an URI that receives the authorization code. In this embodiment, it is assumed that the redirect URI is not designated.

Then, in S1.4 of FIG. 10, the authorization server module 210 acquires the application authorization token transmitted as the authentication information. In S1.5, the authorization server module 210 acquires information of the user's tenant ID associated with the application authorization token with reference to the token management table and the user management table (Table 2) on the basis of the acquired application authorization token. When there is no information of the user's tenant ID associated with the application authorization token, the authorization server module 210 transmits an error response to the resource server cooperating application 540.

Then, in S1.6, the authorization server module 210 newly registers the tenant-dedicated client in the client management table. More specifically, the authorization server module 210 issues a client ID and a secret and stores the client ID and the secret in the client management table. Thereafter, the client ID issued and registered herein is an ID different from the above-mentioned vendor client ID. The authorization server module 210 stores the acquired tenant ID in the client management table of the memory unit. At this time, the tenant ID is a tenant ID to which the user having delegated authority belongs. Table 12 shows an example of the client management table in which the tenant-dedicated client is newly registered.

TABLE 12

| | Client ID | Secret | Tenant ID | Device serial ID | Redirect URI |
|---|---|---|---|---|---|
| Row 1 | c001@xx.com | xxxxxxxxxx | Vendor | DS10000003 | https://xx/res |
| Row 2 | c002@1000AA | xxxxxxxxxx | 1000AA | DS10000003 | — |

A configuration in which authority which should be set to a default for the registered tenant-dedicated client is set in the certificate management table and a default authority is allocated to the tenant-dedicated client registered in S1.6 on the basis of the setting may be employed. A configuration in which the authority which should be set to a default is defined as a scope and authority corresponding to the scope is allocated to the tenant-dedicated client by delegating authority of the scope together may be employed.

Then, in S5.3, the authorization server module 210 returns the tenant-dedicated client ID and the secret which are issued as the client registration response to the resource server cooperating application 540. The tenant-dedicated client registering process has been described hitherto.

The API call from the device 500 to the resource server module 310 after the tenant-dedicated client is issued will be described below. First, the API call is performed with detection of a variation in a sensor or an instrument of the device 500 as a trigger. For example, when the device 500 is a printer, the trigger for performing the API call is a time at which a print request is remotely received and a printing job is performed, a time at which an amount of remaining material such as ink or toner with which the printer performs a printing job decreases, or the like. For example, when the device 500 is a smartphone, the trigger for performing the API call is a time at which a call is carried out or the like. For example, when the device 500 is a device including a GPS, a time at which the device moves to a specific place or the like is considered as the trigger. Otherwise, a time at which biometric authentication of the user of the device 500 is performed, a time at which a variation in heartbeat occurs or the like is considered as the trigger. The device 500 detects the times and performs the following sequence.

With detection in a variation in the device 500 as a trigger, the resource server cooperating application 540 requests the authorization server module 210 to issue the tenant-dedicated client authorization token in S5.4. At this time, a scope corresponding to the public API of the resource server module 310 is requested as an authority scope. The processes of S2.3 to S2.4 are the same as the above-mentioned processes except for the scope and thus description thereof will not be repeated.

In S5.5, the authorization server module 210 transmits the issued authorization token ID as a response to the resource server cooperating application 540. Subsequently, in S5.6, the resource server cooperating application 540 calls the public API of the resource server module 310 using the acquired authorization token. The API call includes information on the detected variation in the device 500. For example, when the device 500 is a printer and the API call is performed with a printing job as a trigger, the API call includes information such as a printed document name, a printing person, the number of sheets printed, or color or monochrome.

In S2.13, the resource server module 310 requests the authorization server module 210 to verify the acquired authorization token. In S2.14, the authorization server module 210 verifies whether the authorization token is registered in the token management table. When the authorization token is registered in the token management table, the authorization server module 210 performs the following process. The authorization server module 210 responds with the tenant-dedicated client ID and the tenant ID as information associated with the application authorization token ID with reference to the token management table and the client management table.

In S2.15, the resource server module 310 confirms the acquired tenant ID of the tenant-dedicated client as a process based on the API call. The resource server module 310 performs the following process using the tenant ID of the tenant-dedicated client. The resource server module 310 treats a variety of information received at the time of the API call and detected from the device 500 as information of the tenant ID of the tenant-dedicated client. More specifically, the resource server module 310 stores the information in a nonvolatile memory in a format which can be referred to by only a user belonging to the tenant ID of the tenant-dedicated client. For example, the resource server module 310 transmits an electronic mail to a user belonging to the tenant ID of the tenant-dedicated client. What process should be performed is defined for each public API.

Subsequently, in S2.16, the resource server module 310 returns a response of the API to the resource server cooperating application 540 and ends the process. Use of a service provided from the resource server module 310 using the second method of the third mode has been described hitherto.

In the third mode, since a device can be registered as a tenant-dedicated client of a user of the device, data transmitted from the device is associated with a tenant of the user of the device. In the third mode, the device serial ID is not used to associate the device and the tenant unlike the first mode. Accordingly, even when remanufacturing or refurbishing occurs, a risk of leakage of information decreases. In the third mode, since a user does not mediate unlike the second mode, a constraint depending on a login status of the user or a registration status of the user is not caused. Accordingly, even when a cloud service of a multi-tenant type is used, a client can belong to a specific tenant. As a result, the risk that information of personal privacy or confidential information included in the data will leak to another tenant or the vendor providing the cloud service decreases.

The first, second, and third modes can be used properly depending on use cases in a device. That is, all the modes may be configured to be realized. Some modes may be exclusively performed.

Figure 11:
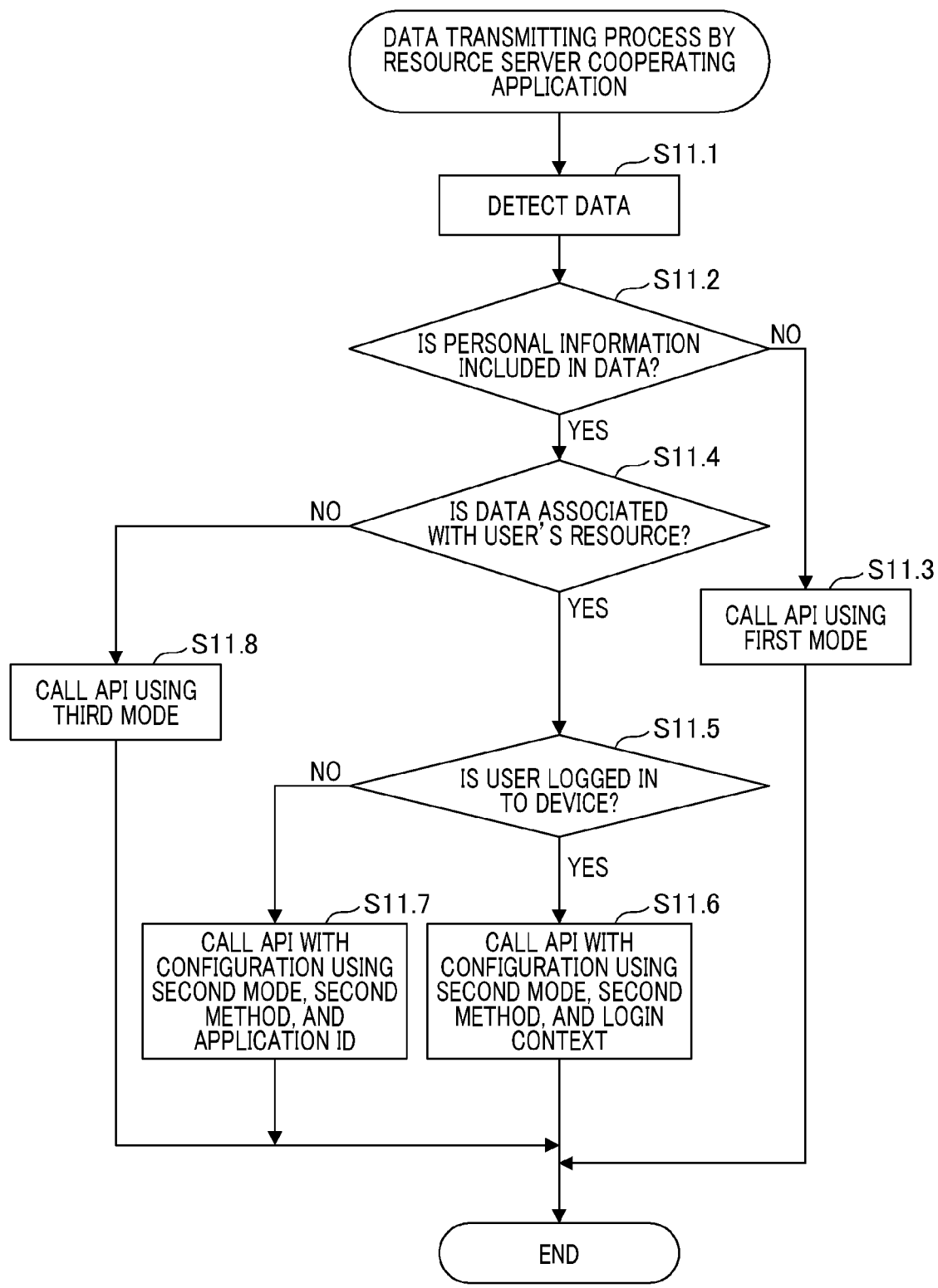
FIG. 11 is a diagram illustrating a determination process using first, second, and third modes properly.
Figure 12:
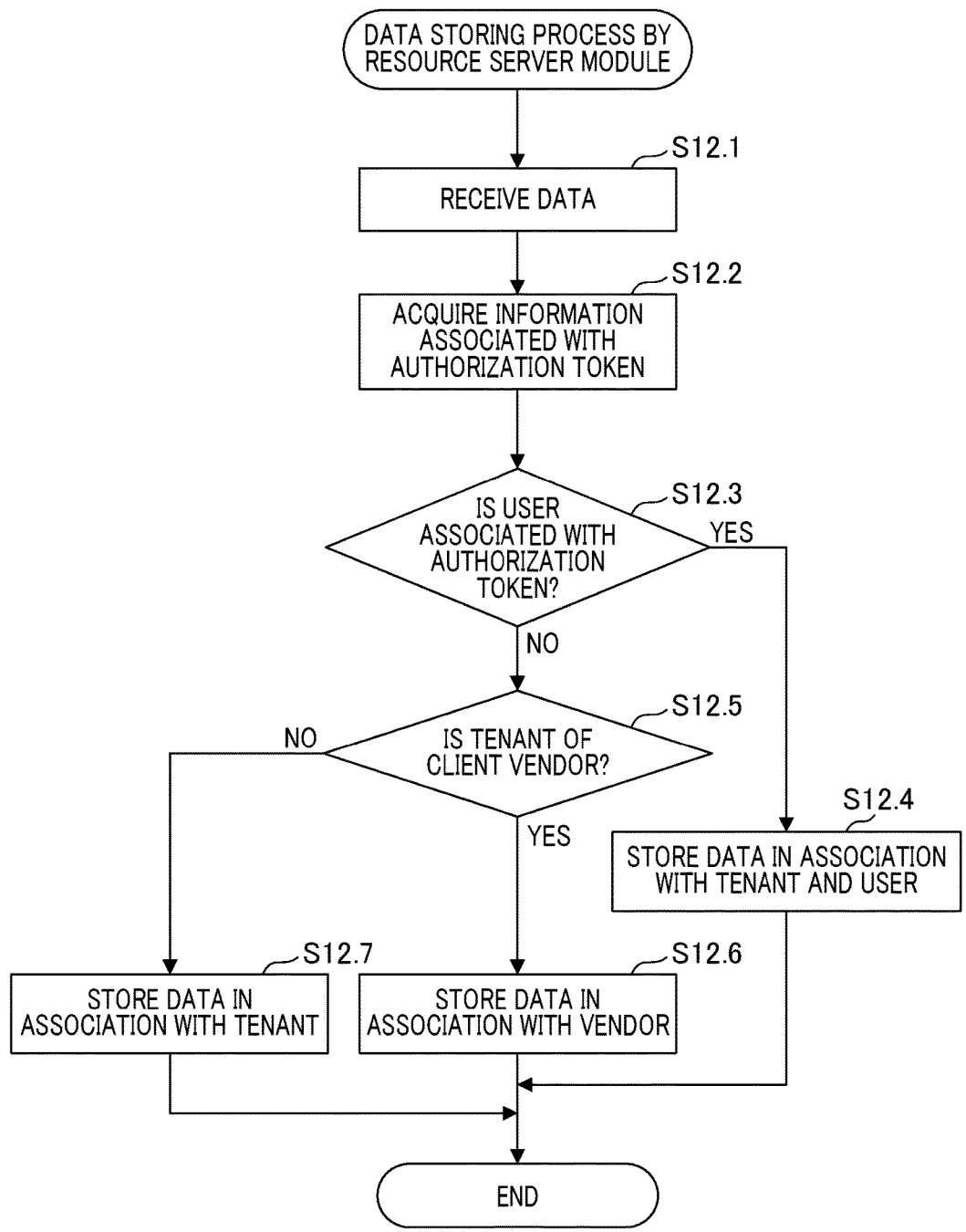
FIG. 12 is a diagram illustrating a determination process using first, second, and third modes properly.

FIGS. 11 and 12 are diagrams illustrating a determination process of using the first, second, and third modes properly in the resource server cooperating application and the resource server module.

FIG. 11 is a flowchart illustrating a data transmitting process in the resource server cooperating application 540. Data to be transmitted is data (for example, data to be uploaded) to be transmitted to the resource server module 310 at the time of the API call, that is, at the time of use of a service.

In S11.1, the resource server cooperating application 540 detects data. Subsequently, in S11.2, the resource server cooperating application 540 determines whether the data includes personal information. When the data does not include personal information, the process of S11.3 is performed. Then, the resource server cooperating application 540 calls the API of the resource server module 310 using the first mode. When the data does not include personal information, the process of S11.4 may be performed. The processes of S11.4 to S11.7 may be skipped and the API call may be performed in the third mode in S11.8 when the data includes personal information.

In S11.4, the resource server cooperating application 540 determines whether the data to be transmitted is data relevant to a user of the authorization server module 210. An example of the data relevant to the user is an operation log of the user. When the data to be transmitted is data relevant to the user of the authorization server module 210, the process of S11.5 is performed. In S11.5, the resource server cooperating application 540 determines whether the user logs in to the device 500. When the user logs in to the device 500, the process of S11.6 is performed. In S11.6, the resource server cooperating application 540 calls the API of the resource server module 310 using the configuration in which a refresh token is stored in association with a login context in the second method of the second mode.

When the user does not log in to the device 500, the process of S11.7 is performed. In S11.7, the resource server cooperating application 540 calls the API of the resource server module 310 using the configuration in which a refresh token is stored in association with an application ID in the second method of the second mode. When it is determined in S11.4 that the data to be transmitted is data relevant to the user of the authorization server module 210, the determination process of S11.5 may be skipped. In this case, the resource server cooperating application 540 calls the API in the second mode, that is, in a mode using a tenant to which the user having delegated authority in the service of the resource server 300 to the device 500 belongs.

When it is determined in S11.4 that the data to be transmitted is not data relevant to the user of the authorization server module 210, the process of S11.8 is performed. In S11.8, the resource server cooperating application 540 calls the API of the resource server module 310 using the third mode. By the above-mentioned process, the resource server cooperating application 540 can use the service of the resource server module 310 by using a plurality of modes properly depending on data characteristics.

FIG. 12 is a flowchart illustrating a data receiving process in the resource server module 310.

In S12.1, the resource server module 310 receives data. At this time, the resource server module 310 receives the authorization token or the application authorization token as the API together. Subsequently, in S12.2, information associated with the authorization token is acquired. Specifically, the resource server module 310 requests the authorization server module 210 to verify the authorization token and acquires information associated with the authorization token as a response thereto. In a mode in which Authorization Code Grant is used as the information associated with the authorization token, the UUID of the user, the user's tenant ID, the client ID, and the tenant ID of the client are acquired. A device serial ID or an application ID may be acquired as the information associated with the authorization token.

In S12.3, the resource server module 310 determines whether the information associated with the authorization token includes the UUID of the user. When the UUID of the user is included in the information associated with the authorization token, the process of S12.4 is performed. In S12.4, the resource server module 310 stores data in association with the UUID of the user and the tenant ID of the user and ends the process.

When the UUID of the user is not included in the information associated with the authorization token, the process of S12.5 is performed. In S12.5, the resource server module 310 determines whether the tenant of the client is a vendor by confirming the tenant ID of the client in the information associated with the authorization token. When the tenant of the client is a vendor, the process of S12.6 is performed. In S12.6, the resource server module 310 stores the data in association with the vendor and ends the process.

When the tenant of the client is not a vendor, the process of S12.7 is performed. In S12.7, the resource server module 310 stores the data in association with the tenant ID of the client and ends the process. By the above-mentioned process, the data transmitted from the device 500 is stored in the resource server module 310 depending on characteristics of the data. As a result, the resource server cooperating application 540 can transmit detailed data including information on personal privacy or confidential information. As a result, the resource server module 310 can treat data with security guaranteed. For example, more useful analysis results of information accumulated as big data can be acquired in the tenant.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-240613, filed Dec. 9, 2015, which is hereby incorporated by reference wherein in its entirety.

What is claimed is:

1. An authorization delegation system that comprises an information processing apparatus, a service providing apparatus configured to provide a service via a network, and an authorization server and that registers the information processing apparatus as a client in the authorization server,
wherein the information processing apparatus comprises:
at least one first processor and at least one first memory coupled to the at least one first processor and having stored thereon instructions that, when executed by the at least one first processor, cause the at least one first processor and the at least one first memory to cooperatively act as:
a first acquisition requesting unit configured to transmit an acquisition request for first authorization information indicating that a user's authority to create a second client is delegated to a first client on the basis of first authentication information provided from the authorization server in accordance with a registration of the first client in the authorization server; and
a registration requesting unit configured to transmit a registration request for the second client to the authorization server in accordance with an acquisition of the first authorization information in response to the acquisition request by the first acquisition requesting unit,
wherein the authorization server comprises:
at least one second processor and at least one second memory coupled to the at least one second processor and having stored thereon instructions that, when executed by the at least one second processor, cause the at least one second processor and the at least one second memory to cooperatively act as:
a managing unit configured to specify a tenant of the user on the basis of the first authorization information transmitted along with the registration request and to manage the specified tenant and the second client to be newly registered in association with each other; and
an issuing unit configured to issue second authentication information corresponding to the second client which is managed in association with the tenant,
wherein the at least one first processor and the at least one first memory in the information processing apparatus further cooperatively act as:
a second acquisition requesting unit configured to transmit an acquisition request for second authorization information indicating that a specific authority is delegated to the second client on the basis of the second authentication information provided from the authorization server in accordance with a registration of the second client in response to the registration request; and
a using unit configured to use a service of the service providing apparatus on the basis of the second authorization information acquired in response to the acquisition request by the second acquisition requesting unit, and
wherein the service providing apparatus comprises at least one third processor and at least one third memory coupled to the at least one third processor and having stored thereon instructions that, when executed by the at least one third processor, cause the at least one third processor and the at least one third memory to cooperatively act as:
a storing unit configured to confirm the specified tenant on the basis of the second authorization information and to store data relevant to provision of the service in association with the confirmed tenant.

2. The authorization delegation system according to claim 1, wherein the second processor and the second memory of the authorization server further cooperate to act as:
a screen transmitting unit configured to transmit authorization confirmation screen data to a terminal which is operated by the user in response to the acquisition request for the first authorization information;
a first providing unit configured to provide the first authorization information if the user provides an instruction for permission of delegation of the authority to create the second client to the first client via the authorization confirmation screen displayed in the terminal;

a second providing unit configured to provide the second authorization information in response to the acquisition request from the second acquisition requesting unit; and an authorizing unit configured to verify whether or not to authorize the using unit to use the service of the service providing apparatus with the specific authority on the basis of the second authorization information transmitted when the using unit uses the service of the service providing apparatus.

3. The authorization delegation system according to claim 1, wherein registering of the first client in the authorization server is performed in response to the registration request that does not include information of the tenant of the user.

4. The authorization delegation system according to claim 1, wherein the second processer and the second memory of the authorization server cooperate to act as a memory unit configured to store the second authorization information which is associated at least with the second client and the tenant.

5. The authorization delegation system according to claim 1, wherein the using unit determines whether personal information is included in data transmitted to the service providing apparatus when using the service and uses the service of the service providing apparatus on the basis of the second authorization information if the personal information is included in the data.

6. The authorization delegation system according to claim 5, wherein, if the personal information is included in the data, the using unit determines whether the data is data associated with a user of the authorization server and, if the data is not data associated with the user of the authorization server, the using unit uses the service of the service providing apparatus on the basis of the second authorization information.

7. The authorization delegation system according to claim 5, wherein, if the personal information is not included in the data, the using unit uses the service of the service providing apparatus in a first mode in which authorization information associated with the information processing apparatus registered in the authorization server and a tenant and a tenant associated with the information processing apparatus registered in the service providing apparatus are used.

8. The authorization delegation system according to claim 7, wherein the tenant is registered in the service providing server in association with the information processing apparatus by causing the information processing apparatus to transmit a key associated with a tenant ID indicating the tenant along with a device serial ID indicating the information processing apparatus to the service providing apparatus.

9. The authorization delegation system according to claim 6, wherein, if the data is data associated with the user of the authorization server, the using unit uses the service of the service providing apparatus in a second mode in which authorization information associated with the user having delegating authority on the service of the service providing apparatus to the information processing apparatus is used.

10. The authorization delegation system according to claim 9,
wherein, if the data is data associated with the user of the authorization server, the using unit determines whether the user is logged in to the information processing apparatus, and
wherein, if the user is not logged in to the information processing apparatus, the using unit uses the service of the service providing apparatus in one mode of the second mode in which authorization information which is issued in response to a refresh request of a refresh token stored in association with an application ID in the information processing apparatus by the delegation of the authority.

11. The authorization delegation system according to claim 9,
wherein, if the data is data associated with the user of the authorization server, the using unit determines whether the user is logged in to the information processing apparatus, and
wherein, if the user is logged in to the information processing apparatus, the using unit uses the service of the service providing apparatus in one mode of the second mode in which authorization information which is issued in response to a refresh request of a refresh token stored in association with a login context in the information processing apparatus by the delegation of the authority.

12. The authorization delegation system according to claim 1,
wherein the acquisition request for the first authorization information includes the first authentication information including a client ID indicating the first client and a secret, and
wherein the acquisition request for the second authorization information includes the second authentication information including a client ID indicating the second client and a secret.

13. A control method for an authorization server that registers an information processing apparatus as a client and performs an authorization process for the information processing apparatus to use a service provided from a service providing apparatus via a network, the control method comprising:
registering a first client in response to a registration request for the first client from the information processing apparatus and issuing first authentication information;
providing first authorization information to the information processing apparatus in response to an acquisition request for the first authorization information indicating that a user's authority to create a second client is delegated to the information processing apparatus, wherein the acquisition requests for the first authorization information is transmitted from the information processing apparatus in which the first authentication information is provided;
specifying a tenant of the user on the basis of the first authorization information transmitted along with a registration request for the second client in response to the registration request transmitted from the information processing apparatus in which the first authorization information is provided and managing the specified tenant in associated with the second client which is newly registered;
issuing second authentication information corresponding to the second client which is managed in association with the tenant; and
providing second authorization information to the information processing apparatus in response to an acquisition request from the information processing apparatus for the second authorization information indicating that a specific authority is delegated to the information processing apparatus, wherein the acquisition request for the second authorization information is based on the second authentication information provided in response to the registration of the second client, wherein the information processing apparatus uses the service of the service providing apparatus on the basis of the second authorization information.

14. A non-transitory storage medium on which is stored a computer program for making a computer execute a method for controlling an authorization server that registers an information processing apparatus as a client and performs an authorization process for the information processing apparatus to use a service provided from a service providing apparatus via a network, the method comprising:

registering a first client in response to a registration request for the first client from the information processing apparatus and issuing first authentication information;

providing first authorization information to the information processing apparatus in response to an acquisition request for the first authorization information indicating that a user's authority to create a second client is delegated to the information processing apparatus, wherein the acquisition requests for the first authorization information is transmitted from the information processing apparatus in which the first authentication information is provided;

specifying a tenant of the user on the basis of the first authorization information transmitted along with a registration request for the second client in response to the registration request transmitted from the information processing apparatus in which the first authorization information is provided and managing the specified tenant in associated with the second client which is newly registered;

issuing second authentication information corresponding to the second client which is managed in association with the tenant; and providing second authorization information to the information processing apparatus in response to an acquisition request from the information processing apparatus for the second authorization information indicating that a specific authority is delegated to the information processing apparatus, wherein the acquisition request for the second authorization information is based on the second authentication information provided in response to the registration of the second client, wherein the information processing apparatus uses the service of the service providing apparatus on the basis of the second authorization information.

* * * * *